United States Patent
Brockmann et al.

(10) Patent No.: US 9,326,047 B2
(45) Date of Patent: Apr. 26, 2016

(54) OVERLAY RENDERING OF USER INTERFACE ONTO SOURCE VIDEO

(71) Applicant: ActiveVideo Networks, Inc., San Jose, CA (US)

(72) Inventors: Ronald A. Brockmann, Utrecht (NL); Onne Gorter, Hilversum (NL); Anuj Dev, Amsterdam (NL); Gerritt Hiddink, Amersfoort (NL)

(73) Assignee: ACTIVEVIDEO NETWORKS, INC., San Jose, CA (US)

( * ) Notice: Subject to any disclaimer, the term of this patent is extended or adjusted under 35 U.S.C. 154(b) by 0 days.

(21) Appl. No.: 14/298,796

(22) Filed: Jun. 6, 2014

(65) Prior Publication Data
US 2014/0366057 A1    Dec. 11, 2014

Related U.S. Application Data

(60) Provisional application No. 61/832,069, filed on Jun. 6, 2013.

(51) Int. Cl.
*G06F 3/00* (2006.01)
*G06F 13/00* (2006.01)
(Continued)

(52) U.S. Cl.
CPC ....... *H04N 21/8545* (2013.01); *H04N 21/4307* (2013.01); *H04N 21/4348* (2013.01);
(Continued)

(58) Field of Classification Search
CPC ............ H04N 21/8545; H04N 21/482; H04N 21/64322; H04N 21/4307; H04N 21/4348; H04N 21/440263; H04N 21/440281; H04N 21/4622
See application file for complete search history.

(56) References Cited

U.S. PATENT DOCUMENTS

| | | | |
|---|---|---|---|
| 3,889,050 A | 6/1975 | Thompson |
| 3,934,079 A | 1/1976 | Barnhart |

(Continued)

FOREIGN PATENT DOCUMENTS

| | | |
|---|---|---|
| AT | 191599 T | 4/2000 |
| AT | 198969 T | 2/2001 |

(Continued)

OTHER PUBLICATIONS

AC-3 digital audio compression standard, Extract, Dec. 20, 1995, 11 pgs.

(Continued)

*Primary Examiner* — Oschta Montoya
(74) *Attorney, Agent, or Firm* — Morgan, Lewis & Bockius LLP

(57) ABSTRACT

A method of combining an interactive user interface for generating a blended output that includes the interactive user interface and one or more supplemental images. At a client device remote from a server, a video stream that contains an interactive user interface is received from the server using a first data communications channel configured to communicate video content, and a command that relates to an interactive user interface is transmitted to the server. In response to the transmitting, an updated user interface is received from the server using the first data communications channel, and one or more supplemental images for supplementing the interactive user interface are received using a second data communications channel different from the first data communications channel. The updated user interface and the one or more supplemental images are blended to generate a blended output, which is transmitted toward the display device for display thereon.

9 Claims, 11 Drawing Sheets

(51) Int. Cl.

| | |
|---|---|
| *H04N 5/445* | (2011.01) |
| *H04N 21/8545* | (2011.01) |
| *H04N 21/482* | (2011.01) |
| *H04N 21/643* | (2011.01) |
| *H04N 21/43* | (2011.01) |
| *H04N 21/434* | (2011.01) |
| *H04N 21/4402* | (2011.01) |
| *H04N 21/462* | (2011.01) |

(52) U.S. Cl.
CPC ............ *H04N21/440263* (2013.01); *H04N 21/440281* (2013.01); *H04N 21/4622* (2013.01); *H04N 21/482* (2013.01); *H04N 21/64322* (2013.01)

(56) References Cited

U.S. PATENT DOCUMENTS

| | | |
|---|---|---|
| 3,997,718 A | 12/1976 | Ricketts et al. |
| 4,002,843 A | 1/1977 | Rackman |
| 4,032,972 A | 6/1977 | Saylor |
| 4,077,006 A | 2/1978 | Nicholson |
| 4,081,831 A | 3/1978 | Tang et al. |
| 4,107,734 A | 8/1978 | Percy et al. |
| 4,107,735 A | 8/1978 | Frohbach |
| 4,145,720 A | 3/1979 | Weintraub et al. |
| 4,168,400 A | 9/1979 | de Couasnon et al. |
| 4,186,438 A | 1/1980 | Benson et al. |
| 4,222,068 A | 9/1980 | Thompson |
| 4,245,245 A | 1/1981 | Matsumoto et al. |
| 4,247,106 A | 1/1981 | Jeffers et al. |
| 4,253,114 A | 2/1981 | Tang et al. |
| 4,264,924 A | 4/1981 | Freeman |
| 4,264,925 A | 4/1981 | Freeman et al. |
| 4,290,142 A | 9/1981 | Schnee et al. |
| 4,302,771 A | 11/1981 | Gargini |
| 4,308,554 A | 12/1981 | Percy et al. |
| 4,350,980 A | 9/1982 | Ward |
| 4,367,557 A | 1/1983 | Stern et al. |
| 4,395,780 A | 7/1983 | Gohm et al. |
| 4,408,225 A | 10/1983 | Ensinger et al. |
| 4,450,477 A | 5/1984 | Lovett |
| 4,454,538 A | 6/1984 | Toriumi |
| 4,466,017 A | 8/1984 | Banker |
| 4,471,380 A | 9/1984 | Mobley |
| 4,475,123 A | 10/1984 | Dumbauld et al. |
| 4,484,217 A | 11/1984 | Block et al. |
| 4,491,983 A | 1/1985 | Pinnow et al. |
| 4,506,387 A | 3/1985 | Walter |
| 4,507,680 A | 3/1985 | Freeman |
| 4,509,073 A | 4/1985 | Baran et al. |
| 4,523,228 A | 6/1985 | Banker |
| 4,533,948 A | 8/1985 | McNamara et al. |
| 4,536,791 A | 8/1985 | Campbell et al. |
| 4,538,174 A | 8/1985 | Gargini et al. |
| 4,538,176 A | 8/1985 | Nakajima et al. |
| 4,553,161 A | 11/1985 | Citta |
| 4,554,581 A | 11/1985 | Tentler et al. |
| 4,555,561 A | 11/1985 | Sugimori et al. |
| 4,562,465 A | 12/1985 | Glaab |
| 4,567,517 A | 1/1986 | Mobley |
| 4,573,072 A | 2/1986 | Freeman |
| 4,591,906 A | 5/1986 | Morales-Garza et al. |
| 4,602,279 A | 7/1986 | Freeman |
| 4,614,970 A | 9/1986 | Clupper et al. |
| 4,616,263 A | 10/1986 | Eichelberger |
| 4,625,235 A | 11/1986 | Watson |
| 4,627,105 A | 12/1986 | Ohashi et al. |
| 4,633,462 A | 12/1986 | Stifle et al. |
| 4,670,904 A | 6/1987 | Rumreich |
| 4,682,360 A | 7/1987 | Frederiksen |
| 4,695,880 A | 9/1987 | Johnson et al. |
| 4,706,121 A | 11/1987 | Young |
| 4,706,285 A | 11/1987 | Rumreich |
| 4,709,418 A | 11/1987 | Fox et al. |
| 4,710,971 A | 12/1987 | Nozaki et al. |
| 4,718,086 A | 1/1988 | Rumreich et al. |
| 4,732,764 A | 3/1988 | Hemingway et al. |
| 4,734,764 A | 3/1988 | Pocock et al. |
| 4,748,689 A | 5/1988 | Mohr |
| 4,749,992 A | 6/1988 | Fitzemeyer et al. |
| 4,750,036 A | 6/1988 | Martinez |
| 4,754,426 A | 6/1988 | Rast et al. |
| 4,760,442 A | 7/1988 | O'Connell et al. |
| 4,763,317 A | 8/1988 | Lehman et al. |
| 4,769,833 A | 9/1988 | Farleigh et al. |
| 4,769,838 A | 9/1988 | Hasegawa |
| 4,789,863 A | 12/1988 | Bush |
| 4,792,849 A | 12/1988 | McCalley et al. |
| 4,801,190 A | 1/1989 | Imoto |
| 4,805,134 A | 2/1989 | Calo et al. |
| 4,807,031 A | 2/1989 | Broughton et al. |
| 4,816,905 A | 3/1989 | Tweedy et al. |
| 4,821,102 A | 4/1989 | Ichikawa et al. |
| 4,823,386 A | 4/1989 | Dumbauld et al. |
| 4,827,253 A | 5/1989 | Maltz |
| 4,827,511 A | 5/1989 | Masuko |
| 4,829,372 A | 5/1989 | McCalley et al. |
| 4,829,558 A | 5/1989 | Welsh |
| 4,847,698 A | 7/1989 | Freeman |
| 4,847,699 A | 7/1989 | Freeman |
| 4,847,700 A | 7/1989 | Freeman |
| 4,848,698 A | 7/1989 | Newell et al. |
| 4,860,379 A | 8/1989 | Schoeneberger et al. |
| 4,864,613 A | 9/1989 | Van Cleave |
| 4,876,592 A | 10/1989 | Von Kohorn |
| 4,889,369 A | 12/1989 | Albrecht |
| 4,890,320 A | 12/1989 | Monslow et al. |
| 4,891,694 A | 1/1990 | Way |
| 4,901,367 A | 2/1990 | Nicholson |
| 4,903,126 A | 2/1990 | Kassatly |
| 4,905,094 A | 2/1990 | Pocock et al. |
| 4,912,760 A | 3/1990 | West, Jr. et al. |
| 4,918,516 A | 4/1990 | Freeman |
| 4,920,566 A | 4/1990 | Robbins et al. |
| 4,922,532 A | 5/1990 | Farmer et al. |
| 4,924,303 A | 5/1990 | Brandon et al. |
| 4,924,498 A | 5/1990 | Farmer et al. |
| 4,937,821 A | 6/1990 | Boulton |
| 4,941,040 A | 7/1990 | Pocock et al. |
| 4,947,244 A | 8/1990 | Fenwick et al. |
| 4,961,211 A | 10/1990 | Tsugane et al. |
| 4,963,995 A | 10/1990 | Lang |
| 4,975,771 A | 12/1990 | Kassatly |
| 4,989,245 A | 1/1991 | Bennett |
| 4,994,909 A | 2/1991 | Graves et al. |
| 4,995,078 A | 2/1991 | Monslow et al. |
| 5,003,384 A | 3/1991 | Durden et al. |
| 5,008,934 A | 4/1991 | Endoh |
| 5,014,125 A | 5/1991 | Pocock et al. |
| 5,027,400 A | 6/1991 | Baji et al. |
| 5,051,720 A | 9/1991 | Kittirutsunetorn |
| 5,051,822 A | 9/1991 | Rhoades |
| 5,057,917 A | 10/1991 | Shalkauser et al. |
| 5,058,160 A | 10/1991 | Banker et al. |
| 5,060,262 A | 10/1991 | Bevins, Jr. et al. |
| 5,077,607 A | 12/1991 | Johnson et al. |
| 5,083,800 A | 1/1992 | Lockton |
| 5,088,111 A | 2/1992 | McNamara et al. |
| 5,093,718 A | 3/1992 | Hoarty et al. |
| 5,109,414 A | 4/1992 | Harvey et al. |
| 5,113,496 A | 5/1992 | McCalley et al. |
| 5,119,188 A | 6/1992 | McCalley et al. |
| 5,130,792 A | 7/1992 | Tindell et al. |
| 5,132,992 A | 7/1992 | Yurt et al. |
| 5,133,009 A | 7/1992 | Rumreich |
| 5,133,079 A | 7/1992 | Ballantyne et al. |
| 5,136,411 A | 8/1992 | Paik et al. |
| 5,142,575 A | 8/1992 | Farmer et al. |
| 5,144,448 A | 9/1992 | Hombaker, III et al. |
| 5,155,591 A | 10/1992 | Wachob |
| 5,172,413 A | 12/1992 | Bradley et al. |
| 5,191,410 A | 3/1993 | McCalley et al. |
| 5,195,092 A | 3/1993 | Wilson et al. |

(56) References Cited

U.S. PATENT DOCUMENTS

| | | |
|---|---|---|
| 5,208,665 A | 5/1993 | McCalley et al. |
| 5,220,420 A | 6/1993 | Hoarty et al. |
| 5,230,019 A | 7/1993 | Yanagimichi et al. |
| 5,231,494 A | 7/1993 | Wachob |
| 5,236,199 A | 8/1993 | Thompson, Jr. |
| 5,247,347 A | 9/1993 | Litteral et al. |
| 5,253,341 A | 10/1993 | Rozmanith et al. |
| 5,262,854 A | 11/1993 | Ng |
| 5,262,860 A | 11/1993 | Fitzpatrick et al. |
| 5,303,388 A | 4/1994 | Kreitman et al. |
| 5,319,455 A | 6/1994 | Hoarty et al. |
| 5,319,707 A | 6/1994 | Wasilewski et al. |
| 5,321,440 A | 6/1994 | Yanagihara et al. |
| 5,321,514 A | 6/1994 | Martinez |
| 5,351,129 A | 9/1994 | Lai |
| 5,355,162 A | 10/1994 | Yazolino et al. |
| 5,359,601 A | 10/1994 | Wasilewski et al. |
| 5,361,091 A | 11/1994 | Hoarty et al. |
| 5,371,532 A | 12/1994 | Gelman et al. |
| 5,404,393 A | 4/1995 | Remillard |
| 5,408,274 A | 4/1995 | Chang et al. |
| 5,410,343 A | 4/1995 | Coddington et al. |
| 5,410,344 A | 4/1995 | Graves et al. |
| 5,412,415 A | 5/1995 | Cook et al. |
| 5,412,720 A | 5/1995 | Hoarty |
| 5,418,559 A | 5/1995 | Blahut |
| 5,422,674 A | 6/1995 | Hooper et al. |
| 5,422,887 A | 6/1995 | Diepstraten et al. |
| 5,442,389 A | 8/1995 | Blahut et al. |
| 5,442,390 A | 8/1995 | Hooper et al. |
| 5,442,700 A | 8/1995 | Snell et al. |
| 5,446,490 A | 8/1995 | Blahut et al. |
| 5,469,283 A | 11/1995 | Vinel et al. |
| 5,469,431 A | 11/1995 | Wendorf et al. |
| 5,471,263 A | 11/1995 | Odaka |
| 5,481,542 A | 1/1996 | Logston et al. |
| 5,485,197 A | 1/1996 | Hoarty |
| 5,487,066 A | 1/1996 | McNamara et al. |
| 5,493,638 A | 2/1996 | Hooper et al. |
| 5,495,283 A | 2/1996 | Cowe |
| 5,495,295 A | 2/1996 | Long |
| 5,497,187 A | 3/1996 | Banker et al. |
| 5,517,250 A | 5/1996 | Hoogenboom et al. |
| 5,526,034 A | 6/1996 | Hoarty et al. |
| 5,528,281 A | 6/1996 | Grady et al. |
| 5,537,397 A | 7/1996 | Abramson |
| 5,537,404 A | 7/1996 | Bentley et al. |
| 5,539,449 A | 7/1996 | Blahut et al. |
| RE35,314 E | 8/1996 | Logg |
| 5,548,340 A | 8/1996 | Bertram |
| 5,550,578 A | 8/1996 | Hoarty et al. |
| 5,557,316 A | 9/1996 | Hoarty et al. |
| 5,559,549 A | 9/1996 | Hendricks et al. |
| 5,561,708 A | 10/1996 | Remillard |
| 5,570,126 A | 10/1996 | Blahut et al. |
| 5,570,363 A | 10/1996 | Holm |
| 5,579,143 A | 11/1996 | Huber |
| 5,581,653 A | 12/1996 | Todd |
| 5,583,927 A | 12/1996 | Ely et al. |
| 5,587,734 A | 12/1996 | Lauder et al. |
| 5,589,885 A | 12/1996 | Ooi |
| 5,592,470 A | 1/1997 | Rudrapatna et al. |
| 5,594,507 A | 1/1997 | Hoarty |
| 5,594,723 A | 1/1997 | Tibi |
| 5,594,938 A | 1/1997 | Engel |
| 5,596,693 A | 1/1997 | Needle et al. |
| 5,600,364 A | 2/1997 | Hendricks et al. |
| 5,600,573 A | 2/1997 | Hendricks et al. |
| 5,608,446 A | 3/1997 | Carr et al. |
| 5,617,145 A | 4/1997 | Huang et al. |
| 5,621,464 A | 4/1997 | Teo et al. |
| 5,625,404 A | 4/1997 | Grady et al. |
| 5,630,757 A | 5/1997 | Gagin et al. |
| 5,631,693 A | 5/1997 | Wunderlich et al. |
| 5,631,846 A | 5/1997 | Szurkowski |
| 5,632,003 A | 5/1997 | Davidson et al. |
| 5,649,283 A | 7/1997 | Galler et al. |
| 5,668,592 A | 9/1997 | Spaulding, II |
| 5,668,599 A | 9/1997 | Cheney et al. |
| 5,708,767 A | 1/1998 | Yeo et al. |
| 5,710,815 A | 1/1998 | Ming et al. |
| 5,712,906 A | 1/1998 | Grady et al. |
| 5,740,307 A | 4/1998 | Lane |
| 5,742,289 A | 4/1998 | Naylor et al. |
| 5,748,234 A | 5/1998 | Lippincott |
| 5,754,941 A | 5/1998 | Sharpe et al. |
| 5,786,527 A | 7/1998 | Tarte |
| 5,790,174 A | 8/1998 | Richard, III et al. |
| 5,802,283 A | 9/1998 | Grady et al. |
| 5,812,665 A | 9/1998 | Hoarty et al. |
| 5,812,786 A | 9/1998 | Seazholtz et al. |
| 5,815,604 A | 9/1998 | Simons et al. |
| 5,818,438 A | 10/1998 | Howe et al. |
| 5,821,945 A | 10/1998 | Yeo et al. |
| 5,822,537 A | 10/1998 | Katseff et al. |
| 5,828,371 A | 10/1998 | Cline et al. |
| 5,844,594 A | 12/1998 | Ferguson |
| 5,845,083 A | 12/1998 | Hamadani et al. |
| 5,862,325 A | 1/1999 | Reed et al. |
| 5,864,820 A | 1/1999 | Case |
| 5,867,208 A | 2/1999 | McLaren |
| 5,883,661 A | 3/1999 | Hoarty |
| 5,903,727 A | 5/1999 | Nielsen |
| 5,903,816 A | 5/1999 | Broadwin et al. |
| 5,905,522 A | 5/1999 | Lawler |
| 5,907,681 A | 5/1999 | Bates et al. |
| 5,917,822 A | 6/1999 | Lyles et al. |
| 5,946,352 A | 8/1999 | Rowlands et al. |
| 5,952,943 A | 9/1999 | Walsh et al. |
| 5,959,690 A | 9/1999 | Toebes et al. |
| 5,961,603 A | 10/1999 | Kunkel et al. |
| 5,963,203 A | 10/1999 | Goldberg et al. |
| 5,966,163 A | 10/1999 | Lin et al. |
| 5,978,756 A | 11/1999 | Walker et al. |
| 5,982,445 A | 11/1999 | Eyer et al. |
| 5,990,862 A | 11/1999 | Lewis |
| 5,995,146 A | 11/1999 | Rasmussen |
| 5,995,488 A | 11/1999 | Kalkunte et al. |
| 5,999,970 A | 12/1999 | Krisbergh et al. |
| 6,014,416 A | 1/2000 | Shin et al. |
| 6,021,386 A | 2/2000 | Davis et al. |
| 6,031,989 A | 2/2000 | Cordell |
| 6,034,678 A | 3/2000 | Hoarty et al. |
| 6,049,539 A | 4/2000 | Lee et al. |
| 6,049,831 A | 4/2000 | Gardell et al. |
| 6,052,555 A | 4/2000 | Ferguson |
| 6,055,314 A | 4/2000 | Spies et al. |
| 6,055,315 A | 4/2000 | Doyle et al. |
| 6,064,377 A | 5/2000 | Hoarty et al. |
| 6,078,328 A | 6/2000 | Schumann et al. |
| 6,084,908 A | 7/2000 | Chiang et al. |
| 6,100,883 A | 8/2000 | Hoarty |
| 6,108,625 A | 8/2000 | Kim |
| 6,131,182 A | 10/2000 | Beakes et al. |
| 6,141,645 A | 10/2000 | Chi-Min et al. |
| 6,141,693 A | 10/2000 | Perlman et al. |
| 6,144,698 A | 11/2000 | Poon et al. |
| 6,167,084 A | 12/2000 | Wang et al. |
| 6,169,573 B1 | 1/2001 | Sampath-Kumar et al. |
| 6,177,931 B1 | 1/2001 | Alexander et al. |
| 6,182,072 B1 | 1/2001 | Leak et al. |
| 6,184,878 B1 | 2/2001 | Alonso et al. |
| 6,192,081 B1 | 2/2001 | Chiang et al. |
| 6,198,822 B1 | 3/2001 | Doyle et al. |
| 6,205,582 B1 | 3/2001 | Hoarty |
| 6,226,041 B1 | 5/2001 | Florencio et al. |
| 6,236,730 B1 | 5/2001 | Cowieson et al. |
| 6,243,418 B1 | 6/2001 | Kim |
| 6,253,238 B1 | 6/2001 | Lauder et al. |
| 6,256,047 B1 | 7/2001 | Isobe et al. |
| 6,259,826 B1 | 7/2001 | Pollard et al. |
| 6,266,369 B1 | 7/2001 | Wang et al. |
| 6,266,684 B1 | 7/2001 | Kraus et al. |
| 6,275,496 B1 | 8/2001 | Burns et al. |

(56) References Cited

U.S. PATENT DOCUMENTS

| | | |
|---|---|---|
| 6,292,194 B1 | 9/2001 | Powell, III |
| 6,305,020 B1 | 10/2001 | Hoarty et al. |
| 6,317,151 B1 | 11/2001 | Ohsuga et al. |
| 6,317,885 B1 | 11/2001 | Fries |
| 6,349,284 B1 | 2/2002 | Park et al. |
| 6,385,771 B1 | 5/2002 | Gordon |
| 6,386,980 B1 | 5/2002 | Nishino et al. |
| 6,389,075 B2 | 5/2002 | Wang et al. |
| 6,389,218 B2 | 5/2002 | Gordon et al. |
| 6,415,031 B1 | 7/2002 | Colligan et al. |
| 6,415,437 B1 | 7/2002 | Ludvig et al. |
| 6,438,140 B1 | 8/2002 | Jungers et al. |
| 6,446,037 B1 | 9/2002 | Fielder et al. |
| 6,459,427 B1 | 10/2002 | Mao et al. |
| 6,477,182 B2 | 11/2002 | Calderone |
| 6,480,210 B1 | 11/2002 | Martino et al. |
| 6,481,012 B1 | 11/2002 | Gordon et al. |
| 6,512,793 B1 | 1/2003 | Maeda |
| 6,525,746 B1 | 2/2003 | Lau et al. |
| 6,536,043 B1 | 3/2003 | Guedalia |
| 6,557,041 B2 | 4/2003 | Mallart |
| 6,560,496 B1 | 5/2003 | Michener |
| 6,564,378 B1 | 5/2003 | Satterfield et al. |
| 6,578,201 B1 | 6/2003 | LaRocca et al. |
| 6,579,184 B1 | 6/2003 | Tanskanen |
| 6,584,153 B1 | 6/2003 | Gordon et al. |
| 6,588,017 B1 | 7/2003 | Calderone |
| 6,598,229 B2 | 7/2003 | Smyth et al. |
| 6,604,224 B1 | 8/2003 | Armstrong et al. |
| 6,614,442 B1 | 9/2003 | Ouyang et al. |
| 6,621,870 B1 | 9/2003 | Gordon et al. |
| 6,625,574 B1 | 9/2003 | Taniguchi et al. |
| 6,639,896 B1 | 10/2003 | Goode et al. |
| 6,645,076 B1 | 11/2003 | Sugai |
| 6,651,252 B1 | 11/2003 | Gordon et al. |
| 6,657,647 B1 | 12/2003 | Bright |
| 6,675,385 B1 | 1/2004 | Wang |
| 6,675,387 B1 | 1/2004 | Boucher |
| 6,681,326 B2 | 1/2004 | Son et al. |
| 6,681,397 B1 | 1/2004 | Tsai et al. |
| 6,684,400 B1 | 1/2004 | Goode et al. |
| 6,687,663 B1 | 2/2004 | McGrath et al. |
| 6,691,208 B2 | 2/2004 | Dandrea et al. |
| 6,697,376 B1 | 2/2004 | Son et al. |
| 6,704,359 B1 | 3/2004 | Bayrakeri et al. |
| 6,717,600 B2 | 4/2004 | Dutta et al. |
| 6,718,552 B1 | 4/2004 | Goode |
| 6,721,794 B2 | 4/2004 | Taylor et al. |
| 6,721,956 B2 | 4/2004 | Wasilewski |
| 6,727,929 B1 | 4/2004 | Bates et al. |
| 6,731,605 B1 | 5/2004 | Deshpande |
| 6,732,370 B1 | 5/2004 | Gordon et al. |
| 6,747,991 B1 | 6/2004 | Hemy et al. |
| 6,754,271 B1 | 6/2004 | Gordon et al. |
| 6,754,905 B2 | 6/2004 | Gordon et al. |
| 6,758,540 B1 | 7/2004 | Adolph et al. |
| 6,766,407 B1 | 7/2004 | Lisitsa et al. |
| 6,771,704 B1 | 8/2004 | Hannah |
| 6,785,902 B1 | 8/2004 | Zigmond et al. |
| 6,807,528 B1 | 10/2004 | Truman et al. |
| 6,810,528 B1 | 10/2004 | Chatani |
| 6,813,690 B1 | 11/2004 | Lango et al. |
| 6,817,947 B2 | 11/2004 | Tanskanen |
| 6,886,178 B1 | 4/2005 | Mao et al. |
| 6,907,574 B2 | 6/2005 | Xu et al. |
| 6,931,291 B1 | 8/2005 | Alvarez-Tinoco et al. |
| 6,941,019 B1 | 9/2005 | Mitchell et al. |
| 6,941,574 B1 | 9/2005 | Broadwin et al. |
| 6,947,509 B1 | 9/2005 | Wong |
| 6,952,221 B1 | 10/2005 | Holtz et al. |
| 6,956,899 B2 | 10/2005 | Hall et al. |
| 7,016,540 B1 | 3/2006 | Gong et al. |
| 7,030,890 B1 | 4/2006 | Jouet et al. |
| 7,031,385 B1 | 4/2006 | Inoue et al. |
| 7,050,113 B2 | 5/2006 | Campisano et al. |
| 7,089,577 B1 | 8/2006 | Rakib et al. |
| 7,093,028 B1 | 8/2006 | Shao et al. |
| 7,095,402 B2 | 8/2006 | Kunil et al. |
| 7,114,167 B2 | 9/2006 | Slemmer et al. |
| 7,146,615 B1 | 12/2006 | Hervet et al. |
| 7,151,782 B1 | 12/2006 | Oz et al. |
| 7,158,676 B1 | 1/2007 | Rainsford |
| 7,200,836 B2 | 4/2007 | Brodersen et al. |
| 7,212,573 B2 | 5/2007 | Winger |
| 7,224,731 B2 | 5/2007 | Mehrotra |
| 7,272,556 B1 | 9/2007 | Aguilar et al. |
| 7,310,619 B2 | 12/2007 | Baar et al. |
| 7,325,043 B1 | 1/2008 | Rosenberg et al. |
| 7,346,111 B2 | 3/2008 | Winger et al. |
| 7,360,230 B1 | 4/2008 | Paz et al. |
| 7,412,423 B1 | 8/2008 | Asano |
| 7,412,505 B2 | 8/2008 | Slemmer et al. |
| 7,421,082 B2 | 9/2008 | Kamiya et al. |
| 7,444,306 B2 | 10/2008 | Varble |
| 7,444,418 B2 | 10/2008 | Chou et al. |
| 7,500,235 B2 | 3/2009 | Maynard et al. |
| 7,508,941 B1 | 3/2009 | O'Toole, Jr. et al. |
| 7,512,577 B2 | 3/2009 | Slemmer et al. |
| 7,543,073 B2 | 6/2009 | Chou et al. |
| 7,596,764 B2 | 9/2009 | Vienneau et al. |
| 7,623,575 B2 | 11/2009 | Winger |
| 7,669,220 B2 | 2/2010 | Goode |
| 7,742,609 B2 | 6/2010 | Yeakel et al. |
| 7,743,400 B2 | 6/2010 | Kurauchi |
| 7,751,572 B2 | 7/2010 | Villemoes et al. |
| 7,757,157 B1 | 7/2010 | Fukuda |
| 7,830,388 B1 | 11/2010 | Lu |
| 7,840,905 B1 | 11/2010 | Weber et al. |
| 7,936,819 B2 | 5/2011 | Craig et al. |
| 7,941,645 B1 | 5/2011 | Riach et al. |
| 7,970,263 B1 | 6/2011 | Asch |
| 7,987,489 B2 | 7/2011 | Krzyzanowski et al. |
| 8,027,353 B2 | 9/2011 | Damola et al. |
| 8,036,271 B2 | 10/2011 | Winger et al. |
| 8,046,798 B1 | 10/2011 | Schlack et al. |
| 8,074,248 B2 | 12/2011 | Sigmon et al. |
| 8,118,676 B2 | 2/2012 | Craig et al. |
| 8,136,033 B1 | 3/2012 | Bhargava et al. |
| 8,149,917 B2 | 4/2012 | Zhang et al. |
| 8,155,194 B2 | 4/2012 | Winger et al. |
| 8,155,202 B2 | 4/2012 | Landau |
| 8,170,107 B2 | 5/2012 | Winger |
| 8,194,862 B2 | 6/2012 | Herr et al. |
| 8,243,630 B2 | 8/2012 | Luo et al. |
| 8,270,439 B2 | 9/2012 | Herr et al. |
| 8,284,842 B2 | 10/2012 | Craig et al. |
| 8,296,424 B2 | 10/2012 | Malloy et al. |
| 8,370,869 B2 | 2/2013 | Paek et al. |
| 8,411,754 B2 | 4/2013 | Zhang et al. |
| 8,442,110 B2 | 5/2013 | Pavlovskaia et al. |
| 8,473,996 B2 | 6/2013 | Gordon et al. |
| 8,619,867 B2 | 12/2013 | Craig et al. |
| 8,621,500 B2 | 12/2013 | Weaver et al. |
| 8,656,430 B2* | 2/2014 | Doyle .............................. 725/44 |
| 2001/0008845 A1 | 7/2001 | Kusuda et al. |
| 2001/0049301 A1 | 12/2001 | Masuda et al. |
| 2002/0007491 A1 | 1/2002 | Schiller et al. |
| 2002/0013812 A1 | 1/2002 | Krueger et al. |
| 2002/0016161 A1 | 2/2002 | Dellien et al. |
| 2002/0021353 A1 | 2/2002 | DeNies |
| 2002/0026642 A1 | 2/2002 | Augenbraun et al. |
| 2002/0027567 A1 | 3/2002 | Niamir |
| 2002/0032697 A1 | 3/2002 | French et al. |
| 2002/0040482 A1* | 4/2002 | Sextro et al. .................. 725/136 |
| 2002/0047899 A1 | 4/2002 | Son et al. |
| 2002/0049975 A1 | 4/2002 | Thomas et al. |
| 2002/0054578 A1 | 5/2002 | Zhang et al. |
| 2002/0056083 A1 | 5/2002 | Istvan |
| 2002/0056107 A1 | 5/2002 | Schlack |
| 2002/0056136 A1 | 5/2002 | Wistendahl et al. |
| 2002/0059644 A1 | 5/2002 | Andrade et al. |
| 2002/0062484 A1 | 5/2002 | De Lange et al. |
| 2002/0067766 A1 | 6/2002 | Sakamoto et al. |
| 2002/0069267 A1 | 6/2002 | Thiele |

(56) References Cited

U.S. PATENT DOCUMENTS

| | | |
|---|---|---|
| 2002/0072408 A1 | 6/2002 | Kumagai |
| 2002/0078171 A1 | 6/2002 | Schneider |
| 2002/0078456 A1 | 6/2002 | Hudson et al. |
| 2002/0083464 A1 | 6/2002 | Tomsen et al. |
| 2002/0095689 A1 | 7/2002 | Novak |
| 2002/0105531 A1 | 8/2002 | Niemi |
| 2002/0108121 A1 | 8/2002 | Alao et al. |
| 2002/0131511 A1 | 9/2002 | Zenoni |
| 2002/0136298 A1 | 9/2002 | Anantharamu et al. |
| 2002/0152318 A1 | 10/2002 | Menon et al. |
| 2002/0171765 A1 | 11/2002 | Waki et al. |
| 2002/0175931 A1 | 11/2002 | Holtz et al. |
| 2002/0178447 A1 | 11/2002 | Plotnick et al. |
| 2002/0188628 A1 | 12/2002 | Cooper et al. |
| 2002/0191851 A1 | 12/2002 | Keinan |
| 2002/0194592 A1 | 12/2002 | Tsuchida et al. |
| 2002/0196746 A1 | 12/2002 | Allen |
| 2003/0018796 A1 | 1/2003 | Chou et al. |
| 2003/0020671 A1 | 1/2003 | Santoro et al. |
| 2003/0027517 A1 | 2/2003 | Callway et al. |
| 2003/0035486 A1 | 2/2003 | Kato et al. |
| 2003/0038893 A1 | 2/2003 | Rajamaki et al. |
| 2003/0039398 A1 | 2/2003 | McIntyre |
| 2003/0046690 A1 | 3/2003 | Miller |
| 2003/0051253 A1 | 3/2003 | Barone, Jr. |
| 2003/0058941 A1 | 3/2003 | Chen et al. |
| 2003/0061451 A1 | 3/2003 | Beyda |
| 2003/0065739 A1 | 4/2003 | Shnier |
| 2003/0071792 A1 | 4/2003 | Safadi |
| 2003/0072372 A1 | 4/2003 | Shen et al. |
| 2003/0076546 A1 | 4/2003 | Johnson et al. |
| 2003/0088328 A1 | 5/2003 | Nishio et al. |
| 2003/0088400 A1 | 5/2003 | Nishio et al. |
| 2003/0095790 A1 | 5/2003 | Joshi |
| 2003/0107443 A1 | 6/2003 | Yamamoto |
| 2003/0122836 A1 | 7/2003 | Doyle et al. |
| 2003/0123664 A1 | 7/2003 | Pedlow, Jr. et al. |
| 2003/0126608 A1 | 7/2003 | Safadi et al. |
| 2003/0126611 A1 | 7/2003 | Chernock et al. |
| 2003/0131349 A1 | 7/2003 | Kuczynski-Brown |
| 2003/0135860 A1 | 7/2003 | Dureau |
| 2003/0169373 A1 | 9/2003 | Peters et al. |
| 2003/0177199 A1 | 9/2003 | Zenoni |
| 2003/0188309 A1 | 10/2003 | Yuen |
| 2003/0189980 A1 | 10/2003 | Dvir et al. |
| 2003/0196174 A1 | 10/2003 | Pierre Cote et al. |
| 2003/0208768 A1 | 11/2003 | Urdang et al. |
| 2003/0229719 A1 | 12/2003 | Iwata et al. |
| 2003/0229900 A1 | 12/2003 | Reisman |
| 2003/0231218 A1 | 12/2003 | Amadio |
| 2004/0016000 A1 | 1/2004 | Zhang et al. |
| 2004/0034873 A1 | 2/2004 | Zenoni |
| 2004/0040035 A1 | 2/2004 | Carlucci et al. |
| 2004/0055007 A1 | 3/2004 | Allport |
| 2004/0078822 A1 | 4/2004 | Breen et al. |
| 2004/0088375 A1 | 5/2004 | Sethi et al. |
| 2004/0091171 A1 | 5/2004 | Bone |
| 2004/0111526 A1 | 6/2004 | Baldwin et al. |
| 2004/0117827 A1 | 6/2004 | Karaoguz et al. |
| 2004/0128686 A1 | 7/2004 | Boyer et al. |
| 2004/0133704 A1 | 7/2004 | Krzyzanowski et al. |
| 2004/0136698 A1 | 7/2004 | Mock |
| 2004/0139158 A1 | 7/2004 | Datta |
| 2004/0157662 A1 | 8/2004 | Tsuchiya |
| 2004/0163101 A1 | 8/2004 | Swix et al. |
| 2004/0184542 A1 | 9/2004 | Fujimoto |
| 2004/0193648 A1 | 9/2004 | Lai et al. |
| 2004/0210824 A1 | 10/2004 | Shoff et al. |
| 2004/0261106 A1 | 12/2004 | Hoffman |
| 2004/0261114 A1 | 12/2004 | Addington et al. |
| 2004/0268419 A1 | 12/2004 | Danker et al. |
| 2005/0015259 A1 | 1/2005 | Thumpudi et al. |
| 2005/0015816 A1 | 1/2005 | Christofalo et al. |
| 2005/0021830 A1 | 1/2005 | Urzaiz et al. |
| 2005/0034155 A1 | 2/2005 | Gordon et al. |
| 2005/0034162 A1 | 2/2005 | White et al. |
| 2005/0044575 A1 | 2/2005 | Der Kuyl |
| 2005/0055685 A1 | 3/2005 | Maynard et al. |
| 2005/0055721 A1 | 3/2005 | Zigmond et al. |
| 2005/0071876 A1 | 3/2005 | van Beek |
| 2005/0076134 A1 | 4/2005 | Bialik et al. |
| 2005/0089091 A1 | 4/2005 | Kim et al. |
| 2005/0091690 A1 | 4/2005 | Delpuch et al. |
| 2005/0091695 A1 | 4/2005 | Paz et al. |
| 2005/0105608 A1 | 5/2005 | Coleman et al. |
| 2005/0114906 A1 | 5/2005 | Hoarty et al. |
| 2005/0132305 A1 | 6/2005 | Guichard et al. |
| 2005/0135385 A1 | 6/2005 | Jenkins et al. |
| 2005/0141613 A1 | 6/2005 | Kelly et al. |
| 2005/0149988 A1 | 7/2005 | Grannan |
| 2005/0155063 A1* | 7/2005 | Bayrakeri et al. |
| 2005/0160088 A1 | 7/2005 | Scallan et al. |
| 2005/0166257 A1 | 7/2005 | Feinleib et al. |
| 2005/0180502 A1 | 8/2005 | Puri |
| 2005/0198682 A1 | 9/2005 | Wright |
| 2005/0213586 A1 | 9/2005 | Cyganski et al. |
| 2005/0216933 A1 | 9/2005 | Black |
| 2005/0216940 A1 | 9/2005 | Black |
| 2005/0226426 A1 | 10/2005 | Oomen et al. |
| 2005/0273832 A1 | 12/2005 | Zigmond et al. |
| 2005/0283741 A1 | 12/2005 | Balabanovic et al. |
| 2006/0001737 A1 | 1/2006 | Dawson et al. |
| 2006/0020960 A1 | 1/2006 | Relan et al. |
| 2006/0020994 A1 | 1/2006 | Crane et al. |
| 2006/0031906 A1 | 2/2006 | Kaneda |
| 2006/0039481 A1 | 2/2006 | Shen et al. |
| 2006/0041910 A1 | 2/2006 | Hatanaka et al. |
| 2006/0088105 A1 | 4/2006 | Shen et al. |
| 2006/0095944 A1 | 5/2006 | Demircin et al. |
| 2006/0112338 A1 | 5/2006 | Joung et al. |
| 2006/0117340 A1 | 6/2006 | Pavlovskaia et al. |
| 2006/0143678 A1 | 6/2006 | Cho et al. |
| 2006/0161538 A1 | 7/2006 | Kiilerich |
| 2006/0173985 A1 | 8/2006 | Moore |
| 2006/0174026 A1 | 8/2006 | Robinson et al. |
| 2006/0174289 A1 | 8/2006 | Theberge |
| 2006/0195884 A1 | 8/2006 | van Zoest et al. |
| 2006/0203913 A1 | 9/2006 | Kim et al. |
| 2006/0212203 A1 | 9/2006 | Furuno |
| 2006/0218601 A1 | 9/2006 | Michel |
| 2006/0230428 A1 | 10/2006 | Craig et al. |
| 2006/0242570 A1 | 10/2006 | Croft et al. |
| 2006/0256865 A1 | 11/2006 | Westerman |
| 2006/0269086 A1 | 11/2006 | Page et al. |
| 2006/0271985 A1 | 11/2006 | Hoffman et al. |
| 2006/0285586 A1 | 12/2006 | Westerman |
| 2006/0285819 A1 | 12/2006 | Kelly et al. |
| 2007/0009035 A1 | 1/2007 | Craig et al. |
| 2007/0009036 A1 | 1/2007 | Craig et al. |
| 2007/0009042 A1 | 1/2007 | Craig |
| 2007/0011702 A1 | 1/2007 | Vaysman |
| 2007/0025639 A1 | 2/2007 | Zhou et al. |
| 2007/0033528 A1 | 2/2007 | Merrit et al. |
| 2007/0033631 A1 | 2/2007 | Gordon et al. |
| 2007/0074251 A1 | 3/2007 | Oguz et al. |
| 2007/0079325 A1 | 4/2007 | de Heer |
| 2007/0115941 A1 | 5/2007 | Patel et al. |
| 2007/0124282 A1 | 5/2007 | Wittkotter |
| 2007/0124795 A1 | 5/2007 | McKissick et al. |
| 2007/0130446 A1 | 6/2007 | Minakami |
| 2007/0130592 A1 | 6/2007 | Haeusel |
| 2007/0152984 A1 | 7/2007 | Ording et al. |
| 2007/0162953 A1 | 7/2007 | Bollinger et al. |
| 2007/0172061 A1 | 7/2007 | Pinder |
| 2007/0174790 A1 | 7/2007 | Jing et al. |
| 2007/0178243 A1 | 8/2007 | Dong et al. |
| 2007/0234220 A1 | 10/2007 | Khan et al. |
| 2007/0237232 A1 | 10/2007 | Chang et al. |
| 2007/0300280 A1 | 12/2007 | Turner et al. |
| 2008/0046928 A1 | 2/2008 | Poling et al. |
| 2008/0052742 A1 | 2/2008 | Kopf et al. |
| 2008/0066135 A1 | 3/2008 | Brodersen et al. |
| 2008/0084503 A1 | 4/2008 | Kondo |
| 2008/0086688 A1 | 4/2008 | Chandratillake et al. |

(56) References Cited

U.S. PATENT DOCUMENTS

| | | |
|---|---|---|
| 2008/0086747 A1 | 4/2008 | Rasanen et al. |
| 2008/0094368 A1 | 4/2008 | Ording et al. |
| 2008/0097953 A1 | 4/2008 | Levy et al. |
| 2008/0098450 A1 | 4/2008 | Wu et al. |
| 2008/0104520 A1 | 5/2008 | Swenson et al. |
| 2008/0127255 A1 | 5/2008 | Ress et al. |
| 2008/0154583 A1 | 6/2008 | Goto et al. |
| 2008/0163059 A1 | 7/2008 | Craner |
| 2008/0163286 A1 | 7/2008 | Rudolph et al. |
| 2008/0170619 A1 | 7/2008 | Landau |
| 2008/0170622 A1 | 7/2008 | Gordon et al. |
| 2008/0178125 A1 | 7/2008 | Elsbree et al. |
| 2008/0178243 A1 | 7/2008 | Dong et al. |
| 2008/0178249 A1 | 7/2008 | Gordon et al. |
| 2008/0181221 A1 | 7/2008 | Kampmann et al. |
| 2008/0184120 A1 | 7/2008 | O-Brien-Strain et al. |
| 2008/0189740 A1 | 8/2008 | Carpenter et al. |
| 2008/0195573 A1 | 8/2008 | Onoda et al. |
| 2008/0201736 A1 | 8/2008 | Gordon et al. |
| 2008/0212942 A1 | 9/2008 | Gordon et al. |
| 2008/0222199 A1 | 9/2008 | Tiu et al. |
| 2008/0232452 A1 | 9/2008 | Sullivan et al. |
| 2008/0243918 A1 | 10/2008 | Holtman |
| 2008/0243998 A1 | 10/2008 | Oh et al. |
| 2008/0246759 A1 | 10/2008 | Summers |
| 2008/0253440 A1 | 10/2008 | Srinivasan et al. |
| 2008/0271080 A1 | 10/2008 | Gossweiler et al. |
| 2009/0003446 A1 | 1/2009 | Wu et al. |
| 2009/0003705 A1 | 1/2009 | Zou et al. |
| 2009/0007199 A1 | 1/2009 | La Joie |
| 2009/0025027 A1 | 1/2009 | Craner |
| 2009/0031341 A1 | 1/2009 | Schlack et al. |
| 2009/0041118 A1 | 2/2009 | Pavlovskaia et al. |
| 2009/0083781 A1 | 3/2009 | Yang et al. |
| 2009/0083813 A1 | 3/2009 | Dolce et al. |
| 2009/0083824 A1 | 3/2009 | McCarthy et al. |
| 2009/0089188 A1 | 4/2009 | Ku et al. |
| 2009/0094113 A1 | 4/2009 | Berry et al. |
| 2009/0094646 A1 | 4/2009 | Walter et al. |
| 2009/0100465 A1 | 4/2009 | Kulakowski |
| 2009/0100489 A1 | 4/2009 | Strothmann |
| 2009/0106269 A1 | 4/2009 | Zuckerman et al. |
| 2009/0106386 A1 | 4/2009 | Zuckerman et al. |
| 2009/0106392 A1 | 4/2009 | Zuckerman et al. |
| 2009/0106425 A1 | 4/2009 | Zuckerman et al. |
| 2009/0106441 A1 | 4/2009 | Zuckerman et al. |
| 2009/0106451 A1 | 4/2009 | Zuckerman et al. |
| 2009/0106511 A1 | 4/2009 | Zuckerman et al. |
| 2009/0113009 A1 | 4/2009 | Slemmer et al. |
| 2009/0132942 A1 | 5/2009 | Santoro et al. |
| 2009/0138966 A1 | 5/2009 | Krause et al. |
| 2009/0144781 A1 | 6/2009 | Glaser et al. |
| 2009/0146779 A1 | 6/2009 | Kumar et al. |
| 2009/0157868 A1 | 6/2009 | Chaudhry |
| 2009/0158369 A1 | 6/2009 | Van Vleck et al. |
| 2009/0160694 A1 | 6/2009 | Di Flora |
| 2009/0172757 A1 | 7/2009 | Aldrey et al. |
| 2009/0178098 A1 | 7/2009 | Westbrook et al. |
| 2009/0183219 A1 | 7/2009 | Maynard et al. |
| 2009/0189890 A1 | 7/2009 | Corbett et al. |
| 2009/0193452 A1 | 7/2009 | Russ et al. |
| 2009/0196346 A1 | 8/2009 | Zhang et al. |
| 2009/0204920 A1 | 8/2009 | Beverley et al. |
| 2009/0210899 A1 | 8/2009 | Lawrence-Apfelbaum et al. |
| 2009/0225790 A1 | 9/2009 | Shay et al. |
| 2009/0228620 A1 | 9/2009 | Thomas et al. |
| 2009/0228922 A1 | 9/2009 | Haj-Khalil et al. |
| 2009/0233593 A1 | 9/2009 | Ergen et al. |
| 2009/0251478 A1 | 10/2009 | Maillot et al. |
| 2009/0254960 A1 | 10/2009 | Yarom et al. |
| 2009/0265617 A1 | 10/2009 | Randall et al. |
| 2009/0271512 A1 | 10/2009 | Jorgensen |
| 2009/0271818 A1 | 10/2009 | Schlack |
| 2009/0298535 A1 | 12/2009 | Klein et al. |
| 2009/0313674 A1 | 12/2009 | Ludvig et al. |
| 2009/0328109 A1 | 12/2009 | Pavlovskaia et al. |
| 2010/0033638 A1 | 2/2010 | O'Donnell et al. |
| 2010/0035682 A1 | 2/2010 | Gentile et al. |
| 2010/0058404 A1 | 3/2010 | Rouse |
| 2010/0067571 A1 | 3/2010 | White et al. |
| 2010/0077441 A1 | 3/2010 | Thomas et al. |
| 2010/0104021 A1 | 4/2010 | Schmit |
| 2010/0115573 A1 | 5/2010 | Srinivasan et al. |
| 2010/0118972 A1 | 5/2010 | Zhang et al. |
| 2010/0131996 A1 | 5/2010 | Gauld |
| 2010/0146139 A1* | 6/2010 | Brockmann .................. 709/231 |
| 2010/0158109 A1 | 6/2010 | Dahlby et al. |
| 2010/0161825 A1 | 6/2010 | Ronca et al. |
| 2010/0166071 A1 | 7/2010 | Wu et al. |
| 2010/0174776 A1 | 7/2010 | Westberg et al. |
| 2010/0175080 A1 | 7/2010 | Yuen et al. |
| 2010/0180307 A1 | 7/2010 | Hayes et al. |
| 2010/0211983 A1 | 8/2010 | Chou |
| 2010/0226428 A1 | 9/2010 | Thevathasan et al. |
| 2010/0235861 A1 | 9/2010 | Schein et al. |
| 2010/0242073 A1 | 9/2010 | Gordon et al. |
| 2010/0251167 A1 | 9/2010 | DeLuca et al. |
| 2010/0254370 A1 | 10/2010 | Jana et al. |
| 2010/0265344 A1 | 10/2010 | Velarde et al. |
| 2010/0325655 A1 | 12/2010 | Perez |
| 2010/0325668 A1 | 12/2010 | Young et al. |
| 2011/0002376 A1 | 1/2011 | Ahmed et al. |
| 2011/0002470 A1 | 1/2011 | Purnhagen et al. |
| 2011/0023069 A1 | 1/2011 | Dowens |
| 2011/0035227 A1 | 2/2011 | Lee et al. |
| 2011/0067061 A1 | 3/2011 | Karaoguz et al. |
| 2011/0096828 A1 | 4/2011 | Chen et al. |
| 2011/0107375 A1 | 5/2011 | Stahl et al. |
| 2011/0110642 A1 | 5/2011 | Salomons et al. |
| 2011/0150421 A1 | 6/2011 | Sasaki et al. |
| 2011/0153776 A1 | 6/2011 | Opala et al. |
| 2011/0167468 A1 | 7/2011 | Lee et al. |
| 2011/0191684 A1 | 8/2011 | Greenberg |
| 2011/0231878 A1 | 9/2011 | Hunter et al. |
| 2011/0243024 A1 | 10/2011 | Osterling et al. |
| 2011/0258584 A1 | 10/2011 | Williams et al. |
| 2011/0283304 A1 | 11/2011 | Roberts et al. |
| 2011/0289536 A1 | 11/2011 | Poder et al. |
| 2011/0296312 A1 | 12/2011 | Boyer et al. |
| 2011/0317982 A1 | 12/2011 | Xu et al. |
| 2012/0023126 A1 | 1/2012 | Jin et al. |
| 2012/0030212 A1 | 2/2012 | Koopmans et al. |
| 2012/0137337 A1 | 5/2012 | Sigmon et al. |
| 2012/0204217 A1 | 8/2012 | Regis et al. |
| 2012/0209815 A1 | 8/2012 | Carson et al. |
| 2012/0224641 A1 | 9/2012 | Haberman et al. |
| 2012/0257671 A1 | 10/2012 | Brockmann et al. |
| 2013/0003826 A1 | 1/2013 | Craig et al. |
| 2013/0071095 A1 | 3/2013 | Chauvier et al. |
| 2013/0086610 A1 | 4/2013 | Brockmann |
| 2013/0179787 A1 | 7/2013 | Brockmann et al. |
| 2013/0198776 A1 | 8/2013 | Brockmann |
| 2013/0254308 A1 | 9/2013 | Rose et al. |
| 2013/0272394 A1 | 10/2013 | Brockmann et al. |
| 2013/0304818 A1 | 11/2013 | Brumleve et al. |
| 2014/0033036 A1 | 1/2014 | Gaur et al. |
| 2014/0081954 A1 | 3/2014 | Elizarov |
| 2014/0267074 A1* | 9/2014 | Balci et al. .................. 345/173 |

FOREIGN PATENT DOCUMENTS

| | | |
|---|---|---|
| AT | 250313 T | 10/2003 |
| AT | 472152 T | 7/2010 |
| AT | 475266 T | 8/2010 |
| AU | 199060189 | 11/1990 |
| AU | 620735 B2 | 2/1992 |
| AU | 199184838 | 4/1992 |
| AU | 643828 B2 | 11/1993 |
| AU | 2004253127 A1 | 1/2005 |
| AU | 2005278122 A1 | 3/2006 |
| AU | 2010339376 A1 | 8/2012 |
| AU | 2011249132 A1 | 11/2012 |
| AU | 2011258972 A1 | 11/2012 |
| AU | 2011315950 A1 | 5/2013 |

(56) References Cited

FOREIGN PATENT DOCUMENTS

| | | |
|---|---|---|
| CA | 682776 A | 3/1964 |
| CA | 2052477 | 3/1992 |
| CA | 1302554 | 6/1992 |
| CA | 2163500 | 5/1996 |
| CA | 2231391 A1 | 5/1997 |
| CA | 2273365 A1 | 6/1998 |
| CA | 2313133 A1 | 6/1999 |
| CA | 2313161 A1 | 6/1999 |
| CA | 2528499 A1 | 1/2005 |
| CA | 2569407 A1 | 3/2006 |
| CA | 2728797 A1 | 4/2010 |
| CA | 2787913 A1 | 7/2011 |
| CA | 2798541 A1 | 12/2011 |
| CA | 2814070 A1 | 4/2012 |
| CN | 1507751 A | 6/2004 |
| CN | 1969555 A | 5/2007 |
| CN | 101180109 A | 5/2008 |
| CN | 101627424 A | 1/2010 |
| CN | 101637023 A | 1/2010 |
| CN | 102007773 A | 4/2011 |
| CN | 103647980 A | 3/2014 |
| DE | 4408355 A1 | 10/1994 |
| DE | 69516139 D1 | 12/2000 |
| DE | 69132518 D1 | 9/2001 |
| DE | 69333207 D1 | 7/2004 |
| DE | 98961961 T1 | 8/2007 |
| DE | 602008001596 | 8/2010 |
| DE | 602006015650 | 9/2010 |
| EP | 0128771 A2 | 12/1984 |
| EP | 0419137 A2 | 3/1991 |
| EP | 0449633 A1 | 10/1991 |
| EP | 0477786 A2 | 4/1992 |
| EP | 0523618 A2 | 1/1993 |
| EP | 0534139 A2 | 3/1993 |
| EP | 0568453 A1 | 11/1993 |
| EP | 0588653 A2 | 3/1994 |
| EP | 0594350 A1 | 4/1994 |
| EP | 0612916 A2 | 8/1994 |
| EP | 0624039 A2 | 11/1994 |
| EP | 0638219 A1 | 2/1995 |
| EP | 0643523 A1 | 3/1995 |
| EP | 0661888 A2 | 7/1995 |
| EP | 0714684 A1 | 6/1996 |
| EP | 0746158 A2 | 12/1996 |
| EP | 0761066 A1 | 3/1997 |
| EP | 0789972 A1 | 8/1997 |
| EP | 0830786 A1 | 3/1998 |
| EP | 0861560 A1 | 9/1998 |
| EP | 0 881 808 A2 | 12/1998 |
| EP | 0933966 | 8/1999 |
| EP | 0933966 A1 | 8/1999 |
| EP | 1026872 A1 | 8/2000 |
| EP | 1038397 A1 | 9/2000 |
| EP | 1038399 A1 | 9/2000 |
| EP | 1038400 A1 | 9/2000 |
| EP | 1038401 A1 | 9/2000 |
| EP | 1051039 A2 | 11/2000 |
| EP | 1055331 A1 | 11/2000 |
| EP | 1120968 A1 | 8/2001 |
| EP | 1345446 A1 | 9/2003 |
| EP | 1422929 A2 | 5/2004 |
| EP | 1428562 A2 | 6/2004 |
| EP | 1521476 A1 | 4/2005 |
| EP | 1645115 A1 | 4/2006 |
| EP | 1725044 A2 | 11/2006 |
| EP | 1767708 A2 | 3/2007 |
| EP | 1771003 A1 | 4/2007 |
| EP | 1772014 A1 | 4/2007 |
| EP | 1877150 A1 | 1/2008 |
| EP | 1887148 A2 | 2/2008 |
| EP | 1900200 A1 | 3/2008 |
| EP | 1902583 A1 | 3/2008 |
| EP | 1908293 A1 | 4/2008 |
| EP | 1911288 A2 | 4/2008 |
| EP | 1918802 A1 | 5/2008 |
| EP | 2100296 A1 | 9/2009 |
| EP | 2105019 A2 | 9/2009 |
| EP | 2106665 A2 | 10/2009 |
| EP | 2116051 A2 | 11/2009 |
| EP | 2124440 A1 | 11/2009 |
| EP | 2248341 A1 | 11/2010 |
| EP | 2269377 A2 | 1/2011 |
| EP | 2271098 A1 | 1/2011 |
| EP | 2304953 A2 | 4/2011 |
| EP | 2364019 A2 | 9/2011 |
| EP | 2384001 A1 | 11/2011 |
| EP | 2409493 A2 | 1/2012 |
| EP | 2477414 A2 | 7/2012 |
| EP | 2487919 A2 | 8/2012 |
| EP | 2520090 A2 | 11/2012 |
| EP | 2567545 A1 | 3/2013 |
| EP | 2577437 A1 | 4/2013 |
| EP | 2628306 A2 | 8/2013 |
| EP | 2632164 A2 | 8/2013 |
| EP | 2632165 A2 | 8/2013 |
| EP | 2695388 A2 | 2/2014 |
| ES | 2207635 T3 | 6/2004 |
| FR | 8211463 A | 6/1982 |
| FR | 2529739 | 1/1984 |
| FR | 2891098 | 3/2007 |
| GB | 2207838 A | 2/1989 |
| GB | 2248955 A | 4/1992 |
| GB | 2290204 A | 12/1995 |
| GB | 2365649 A | 2/2002 |
| GB | 2378345 | 2/2003 |
| HK | 1134855 A1 | 10/2010 |
| HK | 1116323 A1 | 12/2010 |
| IE | 19913397 A1 | 4/1992 |
| IL | 99586 A | 2/1998 |
| IL | 215133 | 12/2011 |
| IL | 222829 | 12/2012 |
| IL | 222830 | 12/2012 |
| IL | 225525 | 6/2013 |
| IN | 180215 B | 1/1998 |
| IN | 200701744 P3 | 11/2007 |
| IN | 200900856 P3 | 5/2009 |
| IN | 200800214 P3 | 6/2009 |
| IS | 3759 A7 | 3/1992 |
| JP | 60-054324 A | 3/1985 |
| JP | 63-033988 | 2/1988 |
| JP | 63-263985 A | 10/1988 |
| JP | 2001-241993 A | 9/1989 |
| JP | 04-373286 A | 12/1992 |
| JP | 06-054324 A | 2/1994 |
| JP | 7015720 A | 1/1995 |
| JP | 7-160292 A | 6/1995 |
| JP | 7160292 A | 6/1995 |
| JP | 8095599 A | 4/1996 |
| JP | 8-265704 A | 10/1996 |
| JP | 8265704 A | 10/1996 |
| JP | 10-228437 A | 8/1998 |
| JP | 11-134273 A | 5/1999 |
| JP | H11-261966 | 9/1999 |
| JP | 2000-152234 | 5/2000 |
| JP | 2001-203995 A | 7/2001 |
| JP | 2001-245271 | 9/2001 |
| JP | 2001-245291 | 9/2001 |
| JP | 2001-514471 | 9/2001 |
| JP | 2002-016920 | 1/2002 |
| JP | 2002-057952 A | 2/2002 |
| JP | 2002-112220 A | 4/2002 |
| JP | 2002-141810 A | 5/2002 |
| JP | 2002-208027 | 7/2002 |
| JP | 2002-319991 | 10/2002 |
| JP | 2003-506763 A | 2/2003 |
| JP | 2003-087785 | 3/2003 |
| JP | 2004-501445 A | 1/2004 |
| JP | 2004-056777 A | 2/2004 |
| JP | 2004-110850 | 4/2004 |
| JP | 2004-112441 | 4/2004 |
| JP | 2004-135932 A | 5/2004 |
| JP | 2004-264812 A | 9/2004 |
| JP | 2004-312283 | 11/2004 |
| JP | 2004-533736 A | 11/2004 |

(56) References Cited

FOREIGN PATENT DOCUMENTS

| | | |
|---|---|---|
| JP | 2004-536381 A | 12/2004 |
| JP | 2004-536681 | 12/2004 |
| JP | 2005-033741 | 2/2005 |
| JP | 2005-084987 A | 3/2005 |
| JP | 2005-095599 | 3/2005 |
| JP | 8-095599 A | 4/2005 |
| JP | 2005-156996 | 6/2005 |
| JP | 2005-519382 | 6/2005 |
| JP | 2005-523479 A | 8/2005 |
| JP | 2005-309752 | 11/2005 |
| JP | 2006-067280 | 3/2006 |
| JP | 2006-512838 | 4/2006 |
| JP | 2007-129296 | 5/2007 |
| JP | 2007-522727 | 8/2007 |
| JP | 11-88419 | 9/2007 |
| JP | 2008-535622 A | 9/2008 |
| JP | 04252727 B2 | 4/2009 |
| JP | 2009-543386 A | 12/2009 |
| JP | 2012-080593 A | 4/2012 |
| JP | 04996603 B2 | 8/2012 |
| JP | 05121711 B2 | 1/2013 |
| JP | 53-004612 A | 10/2013 |
| JP | 05331008 B2 | 10/2013 |
| JP | 05405819 B2 | 2/2014 |
| KR | 10-2005-0001362 | 1/2005 |
| KR | 10-2005-0085827 | 8/2005 |
| KR | 2006067924 A | 6/2006 |
| KR | 10-2006-0095821 | 9/2006 |
| KR | 2007038111 A | 4/2007 |
| KR | 20080001298 A | 1/2008 |
| KR | 2008024189 A | 3/2008 |
| KR | 2010111739 A | 10/2010 |
| KR | 2010120187 A | 11/2010 |
| KR | 2010127240 A | 12/2010 |
| KR | 2011030640 A | 3/2011 |
| KR | 2011129477 A | 12/2011 |
| KR | 20120112683 A | 10/2012 |
| KR | 2013061149 A | 6/2013 |
| KR | 2013113925 A | 10/2013 |
| KR | 1333200 B1 | 11/2013 |
| KR | 2008045154 A | 11/2013 |
| KR | 2013138263 A | 12/2013 |
| NL | 1032594 C2 | 4/2008 |
| NL | 1033929 C1 | 4/2008 |
| NL | 2004670 A | 11/2011 |
| NL | 2004780 A | 1/2012 |
| NZ | 239969 A | 12/1994 |
| PT | 99110 A | 12/1993 |
| WO | WO 8202303 A1 | 7/1982 |
| WO | WO 8908967 A1 | 9/1989 |
| WO | WO 90/13972 A1 | 11/1990 |
| WO | WO 93/22877 A2 | 11/1993 |
| WO | WO 9416534 A2 | 7/1994 |
| WO | WO 9419910 A1 | 9/1994 |
| WO | WO 9421079 A1 | 9/1994 |
| WO | WO 95/15658 A1 | 6/1995 |
| WO | WO 9532587 A1 | 11/1995 |
| WO | WO 9533342 A1 | 12/1995 |
| WO | WO 9614712 A1 | 5/1996 |
| WO | WO 9627843 A1 | 9/1996 |
| WO | WO 9631826 A1 | 10/1996 |
| WO | WO 9637074 A2 | 11/1996 |
| WO | WO 9642168 A1 | 12/1996 |
| WO | WO 9716925 A1 | 5/1997 |
| WO | WO 9733434 A1 | 9/1997 |
| WO | WO 9739583 A1 | 10/1997 |
| WO | WO 9826595 A1 | 6/1998 |
| WO | WO 99/00735 A1 | 1/1999 |
| WO | WO 99/04568 | 1/1999 |
| WO | WO 9900735 A1 | 1/1999 |
| WO | WO 9930496 A1 | 6/1999 |
| WO | WO 9930497 A1 | 6/1999 |
| WO | WO 9930500 A1 | 6/1999 |
| WO | WO 9930501 A1 | 6/1999 |
| WO | WO 9935840 A1 | 7/1999 |
| WO | WO 9941911 A1 | 8/1999 |
| WO | WO 9956468 A1 | 11/1999 |
| WO | WO 99/65232 A1 | 12/1999 |
| WO | WO 99/65243 A1 | 12/1999 |
| WO | WO 9966732 A1 | 12/1999 |
| WO | WO 0002303 A1 | 1/2000 |
| WO | WO 00/07372 A1 | 2/2000 |
| WO | WO 00/08967 A1 | 2/2000 |
| WO | WO 00/19910 A1 | 4/2000 |
| WO | WO 00/38430 A1 | 6/2000 |
| WO | WO 00/41397 A1 | 7/2000 |
| WO | WO 01/39494 A1 | 5/2001 |
| WO | WO 01/41447 A1 | 6/2001 |
| WO | WO 01/82614 A1 | 11/2001 |
| WO | WO 01/92973 | 12/2001 |
| WO | WO 02/089487 A2 | 7/2002 |
| WO | WO 02/076097 A1 | 9/2002 |
| WO | WO 02/076099 A1 | 9/2002 |
| WO | WO 03/026232 A1 | 3/2003 |
| WO | WO 03/026275 A2 | 3/2003 |
| WO | WO 03/047710 A2 | 6/2003 |
| WO | WO 03/065683 A1 | 8/2003 |
| WO | WO 03/071727 A2 | 8/2003 |
| WO | WO 03/091832 A2 | 11/2003 |
| WO | WO 2004/012437 A2 | 2/2004 |
| WO | WO 2004/018060 A2 | 3/2004 |
| WO | WO2004/057609 A1 | 7/2004 |
| WO | WO 2004/073310 A1 | 8/2004 |
| WO | WO 2005/002215 A1 | 1/2005 |
| WO | WO 2005/041122 A2 | 5/2005 |
| WO | WO 2005/053301 A2 | 6/2005 |
| WO | WO2005/076575 | 8/2005 |
| WO | WO 2005/120067 A2 | 12/2005 |
| WO | WO 2006/014362 A1 | 2/2006 |
| WO | WO 2006/022881 A1 | 3/2006 |
| WO | WO 2006/053305 | 5/2006 |
| WO | WO 2006/067697 A2 | 6/2006 |
| WO | WO 2006/081634 A2 | 8/2006 |
| WO | WO 2006/105480 | 10/2006 |
| WO | WO 2006/110268 A1 | 10/2006 |
| WO | WO 2007/001797 A1 | 1/2007 |
| WO | WO 2007/008319 A1 | 1/2007 |
| WO | WO 2007/008355 A2 | 1/2007 |
| WO | WO 2007/008356 A1 | 1/2007 |
| WO | WO 2007/008357 A1 | 1/2007 |
| WO | WO 2007/008358 A1 | 1/2007 |
| WO | WO 2007/018722 A2 | 2/2007 |
| WO | WO 2007/018726 A2 | 2/2007 |
| WO | WO2008/044916 A1 | 4/2008 |
| WO | WO 2008/044916 A2 | 4/2008 |
| WO | WO 2008/086170 A1 | 7/2008 |
| WO | WO 2008/088741 A2 | 7/2008 |
| WO | WO 2008/088752 A2 | 7/2008 |
| WO | WO 2008/088772 A2 | 7/2008 |
| WO | WO 2008/100205 A1 | 8/2008 |
| WO | WO2009/038596 | 3/2009 |
| WO | WO 2009/038596 A1 | 3/2009 |
| WO | WO 2009/099893 A1 | 8/2009 |
| WO | WO 2009/099895 A1 | 8/2009 |
| WO | WO 2009/105465 A2 | 8/2009 |
| WO | WO 2009/110897 A1 | 9/2009 |
| WO | WO 2009/114247 A2 | 9/2009 |
| WO | WO 2009/155214 A2 | 12/2009 |
| WO | WO 2010/044926 A3 | 4/2010 |
| WO | WO 2010/054136 A2 | 5/2010 |
| WO | WO 2010/107954 A2 | 9/2010 |
| WO | WO 2011/014336 A1 | 9/2010 |
| WO | WO 2011/082364 A2 | 7/2011 |
| WO | WO 2011/139155 A1 | 11/2011 |
| WO | WO 2011/149357 A1 | 12/2011 |
| WO | WO 2012/051528 A2 | 4/2012 |
| WO | WO 2012/138660 A2 | 10/2012 |
| WO | WO 2013/106390 A1 | 7/2013 |
| WO | WO 2013/155310 A1 | 7/2013 |
| WO | WO2013/184604 A1 | 12/2013 |

OTHER PUBLICATIONS

ActiveVideo Networks BV, International Preliminary Report on Patentability, PCT/NL2011/050308, Sep. 6, 2011, 8 pgs.

(56) References Cited

OTHER PUBLICATIONS

ActiveVideo Networks BV, International Search Report and Written Opinion, PCT/NL2011/050308, Sep. 6, 2011, 8 pgs.
Activevideo Networks Inc., International Preliminary Report on Patentability, PCT/US2011/056355, Apr. 16, 2013, 4 pgs.
ActiveVideo Networks Inc., International Preliminary Report on Patentability, PCT/US2012/032010, Oct. 8, 2013, 4 pgs.
ActiveVideo Networks Inc., International Search Report and Written Opinion, PCT/US2011/056355, Apr. 13, 2012, 6 pgs.
ActiveVideo Networks Inc., International Search Report and Written Opinion, PCT/US2012/032010, Oct. 10, 2012, 6 pgs.
ActiveVideo Networks Inc., International Search Report and Written Opinion, PCT/US2013/020769, May 9, 2013, 9 pgs.
ActiveVideo Networks Inc., International Search Report and Written Opinion, PCT/US2013/036182, Jul. 29, 2013, 12 pgs.
ActiveVideo Networks, Inc., International Search Report and Written Opinion, PCT/US2009/032457, Jul. 22, 2009, 7 pgs.
ActiveVideo Networks Inc., Extended EP Search RPT, Application No. 09820936-4, 11 pgs.
ActiveVideo Networks Inc., Extended EP Search RPT, Application No. 10754084-1, 11 pgs.
ActiveVideo Networks Inc., Extended EP Search RPT, Application No. 10841764.3, 16 pgs.
ActiveVideo Networks Inc., Extended EP Search RPT, Application No. 11833486.1, 6 pgs.
AcitveVideo Networks Inc., Korean Intellectual Property Office, International Search Report; PCT/US2009/032457, Jul. 22, 2009, 7 pgs.
Annex C—Video buffering verifier, information technology—generic coding of moving pictures and associated audio information: video, Feb. 2000, 6 pgs.
Antonoff, Michael, "Interactive Television," Popular Science, Nov. 1992, 12 pages.
Avinity Systems B.V., Extended European Search Report, Application No. 12163713.6, 10 pgs.
Avinity Systems B.V., Extended European Search Report, Application No. 12163712-8, 10 pgs.
Benjelloun, A summation algorithm for MPEG-1 coded audio signals: a first step towards audio processed domain, 2000, 9 pgs.
Broadhead, Direct manipulation of MPEG compressed digital audio, Nov. 5-9, 1995, 41 pgs.
Cable Television Laboratories, Inc., "CableLabs Asset Distribution Interface Specification, Version 1.1", May 5, 2006, 33 pgs.
CD 11172-3, Coding of moving pictures and associated audio for digital storage media at up to about 1.5 MBIT, Jan. 1, 1992, 39 pgs.
Craig, Notice of Allowance, U.S. Appl. No. 11/178,176, Dec. 23, 2010, 8 pgs.
Craig, Notice of Allowance, U.S. Appl. No. 11/178,183, Jan. 12, 2012, 7 pgs.
Craig, Notice of Allowance, U.S. Appl. No. 11/178,183, Jul. 19, 2012, 8 pgs.
Craig, Notice of Allowance, U.S. Appl. No. 11/178,189, Oct. 12, 2011, 7 pgs.
Craig, Notice of Allowance, U.S. Appl. No. 11/178,176, Mar. 23, 2011, 8 pgs.
Craig, Notice of Allowance, U.S. Appl. No. 13/609,183, Aug. 26, 2013, 8 pgs.
Craig, Final Office Action, U.S. Appl. No. 11/103,838, Feb. 5, 2009, 30 pgs.
Craig, Final Office Action, U.S. Appl. No. 11/178,181, Aug. 25, 2010, 17 pgs.
Craig, Final Office Action, U.S. Appl. No. 11/103,838, Jul. 6, 2010, 35 pgs.
Craig, Final Office Action, U.S. Appl. No. 11/178,176, Oct. 1, 2010, 8 pgs.
Craig, Final Office Action, U.S. Appl. No. 11/178,183, Apr. 13, 2011, 16 pgs.
Craig, Final Office Action, U.S. Appl. No. 11/178,177, Oct. 26, 2010, 12 pgs.
Craig, Final Office Action, U.S. Appl. No. 11/178,181, Jun. 20, 2011, 21 pgs.
Craig, Office Action, U.S. Appl. No. 11/103,838, May 12, 2009, 32 pgs.
Craig, Office Action, U.S. Appl. No. 11/103,838, Aug. 19, 2008, 17 pgs.
Craig, Office Action, U.S. Appl. No. 11/103,838, Nov. 19, 2009, 34 pgs.
Craig, Office Action, U.S. Appl. No. 11/178,176, May 6, 2010, 7 pgs.
Craig, Office-Action U.S. Appl. No. 11/178,177, Mar. 29, 2011, 15 pgs.
Craig, Office Action, U.S. Appl. No. 11/178,177, Aug. 3, 2011, 26 pgs.
Craig, Office Action, U.S. Appl. No. 11/178,177, Mar. 29, 2010, 11 pgs.
Craig, Office Action, U.S. Appl. No. 11/178,181, Feb. 11, 2011, 19 pgs.
Craig, Office Action, U.S. Appl. No. 11/178,181, Mar. 29, 2010, 10 pgs.
Craig, Office Action, U.S. Appl. No. 11/178,182, Feb. 23, 2010, 15 pgs.
Craig, Office Action, U.S. Appl. No. 11/178,183, Dec. 6, 2010, 12 pgs.
Craig, Office Action, U.S. Appl. No. 11/178,183, Sep. 15, 2011, 12 pgs.
Craig, Office Action, U.S. Appl. No. 11/178,183, Feb. 19, 2010, 17 pgs.
Craig, Office Action, U.S. Appl. No. 11/178,183, Jul. 20, 2010, 13 pgs.
Craig, Office Action, U.S. Appl. No. 11/178,189, Nov. 9, 2010, 13 pgs.
Craig, Office Action, U.S. Appl. No. 11/178,189, Mar. 15, 2010, 11 pgs.
Craig, Office Action, U.S. Appl. No. 11/178,189, Jul. 23, 2009, 10 pgs.
Craig, Office Action, U.S. Appl. No. 11/178,189, May 26, 2011, 14 pgs.
Craig, Office Action, U.S. Appl. No. 13/609,183, May 9, 2013, 7 pgs.
Pavlovskaia, Office Action, JP 2011-516499, Feb. 14, 2014, 19 pgs.
Digital Audio Compression Standard(AC-3, E-AC-3), Advanced Television Systems Committee, Jun. 14, 2005, 236 pgs.
European Patent Office, Extended European Search Report for International Application No. PCT/US2010/027724, dated Jul. 24, 2012, 11 pages.
FFMPEG, http://www.ffmpeg.org, downloaded Apr. 8, 2010, 8 pgs.
FFMEG-0.4.9 Audio Layer 2 Tables Including Fixed Psycho Acoustic Model, 2001, 2 pgs.
Herr, Notice of Allowance, U.S. Appl. No. 11/620,593, May 23, 2012, 5 pgs.
Herr, Notice of Allowance, U.S. Appl. No. 12/534,016, Feb. 7, 2012, 5 pgs.
Herr, Notice of Allowance, U.S. Appl. No. 12/534,016, Sep. 28, 2011, 15 pgs.
Herr, Final Office Action, U.S. Appl. No. 11/620,593, Sep. 15, 2011, 104 pgs.
Herr, Office Action, U.S. Appl. No. 11/620,593, Mar. 19, 2010, 58 pgs.
Herr, Office Action, U.S. Appl. No. 11/620,593, Apr. 21, 2009 27 pgs.
Herr, Office Action, U.S. Appl. No. 11/620,593, Dec. 23, 2009, 58 pgs.
Herr, Office Action, U.S. Appl. No. 11/620,593, Jan. 24, 2011, 96 pgs.
Herr, Office Action, U.S. Appl. No. 11/620,593, Aug. 27, 2010, 41 pgs.
Herre, Thoughts on an SAOC Architecture, Oct. 2006, 9 pgs.
Hoarty, The Smart Headend—A Novel Approach to Interactive Television, Montreux Int'l TV Symposium, Jun. 9, 1995, 21 pgs.
ICTV, Inc., International Preliminary Report on Patentability, PCT/US2006/022585, Jan. 29, 2008, 9 pgs.
ICTV, Inc., International Search Report / Written Opinion, PCT/US2006/022585, Oct. 12, 2007, 15 pgs.
ICTV, Inc., International Search Report / Written Opinion, PCT/US2008/000419, May 15, 2009, 20 pgs.

(56) References Cited

OTHER PUBLICATIONS

ICTV, Inc., International Search Report / Written Opinion; PCT/US2006/022533, Nov. 20, 2006; 8 pgs.
Isovic, Timing constraints of MPEG-2 decoding for high quality video: misconceptions and realistic assumptions, Jul. 2-4, 2003, 10 pgs.
MPEG-2 Video elementary stream supplemental information, Dec. 1999, 12 pgs.
Ozer, Video Compositing 101. available from http://www.emedialive.com, Jun. 2, 2004, 5pgs.
Porter, Compositing Digital Images, 18 Computer Graphics (No. 3), Jul. 1984, pp. 253-259.
RSS Advisory Board, "RSS 2.0 Specification", published Oct. 15, 2007. Not Found.
SAOC use cases, draft requirements and architecture, Oct. 2006, 16 pgs.
Sigmon, Final Office Action, U.S. Appl. No. 11/258,602, Feb. 23, 2009, 15 pgs.
Sigmon, Office Action, U.S. Appl. No. 11/258,602, Sep. 2, 2008, 12 pgs.
TAG Networks, Inc., Communication pursuant to Article 94(3) EPC, European Patent Application, 06773714.8, May 6, 2009, 3 pgs.
TAG Networks Inc, Decision to Grant a Patent, JP 209-544985, Jun. 28, 2013, 1 pg.
TAG Networks Inc., IPRP, PCT/US2006/010080, Oct. 16, 2007, 6 pgs.
TAG Networks Inc., IPRP, PCT/US2006/024194, Jan. 10, 2008, 7 pgs.
TAG Networks Inc., IPRP, PCT/US2006/024195, Apr. 1, 2009, 11 pgs.
TAG Networks Inc., IPRP, PCT/US2006/024196, Jan. 10, 2008, 6 pgs.
TAG Networks Inc., International Search Report, PCT/US2008/050221, Jun. 12, 2008, 9 pgs.
TAG Networks Inc., Office Action, CN 200680017662.3, Apr. 26, 2010, 4 pgs.
TAG Networks Inc., Office Action, EP 06739032.8, Aug. 14, 2009, 4 pgs.
TAG Networks Inc., Office Action, EP 06773714.8, May 6, 2009, 3 pgs.
TAG Networks Inc., Office Action, EP 06773714.8, Jan. 12, 2010, 4 pgs.
TAG Networks Inc., Office Action, JP 2008-506474, Oct. 10, 2012, 5 pgs.
TAG Networks Inc., Office Action, JP 2008-506474, Aug. 8, 2011, 5 pgs.
TAG Networks Inc., Office Action, JP 2008-520254, Oct. 20, 2011, 2 pgs.
TAG Networks, IPRP, PCT/US2008/050221, Jul. 7, 2009, 6 pgs.
TAG Networks, International Search Report, PCT/US2010/041133, Oct. 19, 2010, 13 pgs.
TAG Networks, Office Action, CN 200880001325.4, Jun. 22, 2011, 4 pgs.
TAG Networks, Office Action, JP 2009-544985, Feb. 25, 2013, 3 pgs.
Talley, A general framework for continuous media transmission control, Oct. 13-16, 1997, 10 pgs.
The Toolame Project, Psych_nl.c, 1999, 1 pg.
Todd, AC-3: flexible perceptual coding for audio transmission and storage, Feb. 26-Mar. 1, 1994, 16 pgs.
Tudor, MPEG-2 Video Compression, Dec. 1995, 15 pgs.
TVHead, Inc., First Examination Report, IN 1744/MUMNP/2007, Dec. 30, 2013, 6 pgs.
TVHead, Inc., International Search Report, PCT/US2006/010080, Jun. 20, 2006, 3 pgs.
TVHead, Inc., International Search Report, PCT/US2006/024194, Dec. 15, 2006, 4 pgs.
TVHead, Inc., International Search Report, PCT/US2006/024195, Nov. 29, 2006, 9 pgs.
TVHead, Inc., International Search Report, PCT/US2006/024196, Dec. 11, 2006, 4 pgs.
TVHead, Inc., International Search Report, PCT/US2006/024197, Nov. 28, 2006, 9 pgs.
Vernon, Dolby digital: audio coding for digital television and storage applications, Aug. 1999, 18 pgs.
Wang, A beat-pattern based error concealment scheme for music delivery with burst packet loss, Aug. 22-25, 2001, 4 pgs.
Wang, A compressed domain beat detector using MP3 audio bitstream, Sep. 30, Oct. 5, 2001, 9 pgs.
Wang, A multichannel audio coding algorithm for inter-channel redundancy removal, May 12-15, 2001, 6 pgs.
Wang, An excitation level based psychoacoustic model for audio compression, Oct. 30-Nov. 4, 1999, 4 pgs.
Wang, Energy compaction property of the MDCT in comparison with other transforms, Sep. 22-25, 2000, 23 pgs.
Wang, Exploiting excess masking for audio compression, Sep. 2-5, 1999, 4 pgs.
Wang, schemes for re-compressing mp3 audio bitstreams, Nov. 30-Dec. 3, 2001, 5 pgs.
Wang, Selected advances in audio compression and compressed domain processing, Aug. 2001, 68 pgs.
Wang, The impact of the relationship between MDCT and DFT on audio compression, Dec. 13-15, 2000, 9 pgs.
ActiveVideo, http://www.activevideo.com/, as printed out in year 2012, 1 pg.
ActiveVideo Networks Inc., International Preliminary Report on Patentability, PCT/US2013/020769, Jul. 24, 2014, 6 pgs.
ActiveVideo Networks Inc., International Search Report and Written Opinion, PCT/US2014/030773, Jul. 25, 2014, 8 pgs.
ActiveVideo Networks Inc., International Search Report and Written Opinion, PCT/US2014/041416, Aug. 27, 2014, 8 pgs.
ActiveVideo Networks Inc., Extended EP Search Rpt, Application No. 13168509.1, 10 pgs.
ActiveVideo Networks Inc., Extended EP Search Rpt, Application No. 13168376-5, 8 pgs.
ActiveVideo Networks Inc., Extended EP Search Rpt, Application No. 12767642-7, 12 pgs.
ActiveVideo Networks Inc., Communication Pursuant to Rules 70(2) and 70a(2), EP10841764.3, Jun. 6, 2014, 1 pg.
ActiveVideo Networks Inc., Communication Pursuant to Rules 70(2) and 70a(2), EP11833486.1, Apr. 24, 2014, 1 pg.
ActiveVideo Networks Inc., Communication Pursuant to Article 94(3) EPC, EP08713106.6-1908, Jun. 26, 2014, 5 pgs.
ActiveVideo Networks Inc., Communication Pursuant to Article 94(3) EPC, EP08713106.6-2223, May 10, 2011, 7 pgs.
ActiveVideo Networks Inc., Communication Pursuant to Article 94(3) EPC, EP09713486.0, Apr. 14, 2014, 6 pgS.
ActiveVideo Networks Inc., Examination Report No. 1, AU2011258972, Apr. 4, 2013, 5 pgs.
ActiveVideo Networks Inc., Examination Report No. 1, AU2010339376, Apr. 30, 2014, 4 pgs.
ActiveVideo Networks Inc., Summons to attend oral-proceeding, Application No. EP09820936-4, Aug. 19, 2014, 4 pgs.
ActiveVideo Networks Inc., International Searching Authority, International Search Report-International application No. PCT/US2010/027724, dated Oct. 28, 2010, together with the Written Opinion of the International Searching Authority, 7 pages.
ActiveVideo Networks, Inc., International Search Report and Written Opinion, PCT/US2014/041430, Oct. 9, 2014, 9 pgs.
Active Video Networks, Notice of Reasons for Rejection, JP2012-547318, Sep. 26, 2014, 7 pgs.
Adams, Jerry, NTZ Nachrichtentechnische Zeitschrift. vol. 40, No. 7, Jul. 1987, Berlin DE pp. 534-536; Jerry Adams: 'Glasfasernetz für Breitbanddienste in London', 5 pgs.
Avinity Systems B.V., Communication pursuant to Article 94(3) EPC, EP 07834561.8, Jan. 31, 2014, 10 pgs.
Avinity Systems B.V., Communication pursuant to Article 94(3) EPC, EP 07834561.8, Apr. 8, 2010, 5 pgs.
Avinity Systems B.V., International Preliminary Report on Patentability, PCT/NL2007/000245, Mar. 31, 2009, 12 pgs.
Avinity Systems B.V., International Search Report and Written Opinion, PCT/NL2007/000245, Feb. 19, 2009, 18 pgs.
Avinity Systems B.V., Notice of Grounds of Rejection for Patent, JP 2009-530298, Sep. 3, 2013, 4 pgs.

(56) References Cited

OTHER PUBLICATIONS

Avinity Systems B.V., Notice of Grounds of Rejection for Patent, JP 2009-530298, Sep. 25, 2012, 6 pgs.
Avinity Systems B. V., Final Office Action, JP-2009-530298, Oct. 7, 2014, 8 pgs.
Bird et al., "Customer Access to Broadband Services," ISSLS 86—The International Symposium on Subrscriber Loops and Services Sep. 29, 1986, Tokyo,JP 6 pgs.
Brockmann, Final Office Action, U.S. Appl. No. 12/443,571, Mar. 7, 2014, 21 pgs.
Brockmann, Final Office Action, U.S. Appl. No. 13/668,004, Jul. 16, 2014, 20 pgs.
Brockmann, Final Office Action, U.S. Appl. No. 13/686,548, Sep. 24, 2014, 13 pgs.
Brockmann, Final Office Action, U.S. Appl. No. 13/438,617, Oct. 3, 2014, 19 pgs.
Brockmann, Office Action, U.S. Appl. No. 13/686,548, Mar. 10, 2014, 11 pgs.
Brockmann, Office Action, U.S. Appl. No. 13/668,004, Dec. 23, 2013, 9 pgs.
Brockmann, Office Action, U.S. Appl. No. 13/438,617, May 12, 2014, 17 pgs.
Brockmann, Office Action, U.S. Appl. No. 12/443,571, Jun. 5, 2013, 18 pgs.
Brockmann, Office Action, U.S. Appl. No. 12/443,571, Nov. 5, 2014, 26 pgs.
Chang, Shih-Fu, et al., "Manipulation and Compositing of MC-DOT Compressed Video, " IEEE Journal on Selected Areas of Communications, Jan. 1995, vol. 13, No. 1, 11 pgs.
Dahlby, Office Action, U.S. Appl. No. 12/651,203, Jun. 5, 2014, 18 pgs.
Dahlby, Final Office Action, U.S. Appl. No. 12/651,203, Feb. 4, 2013, 18 pgs.
Dahlby, Office Action, U.S. Appl. No. 12/651,203, Aug. 16, 2012, 18 pgs.
Dukes, Stephen D., "Photonics for cable television system design, Migrating to regional hubs and passive networks," Communications Engineering and Design, May 1992, 4 pgs.
Ellis, et al., "INDAX: An Operation Interactive Cabletext System", IEEE Journal on Selected Areas in Communications, vol. sac-1, No. 2, Feb. 1983, pp. 285-294.
European Patent Office, Supplementary European Search Report, Application No. EP 09 70 8211, dated Jan. 5, 2011, 6 pgs.
Frezza, W., "The Broadband Solution-Metropolitan CATV Networks," Proceedings of Videotex '84, Apr. 1984, 15 pgs.
Gecsei, J., "Topology of Videotex Networks," The Architecture of Videotex Systems, Chapter 6, 1983 by Prentice-Hall, Inc.
Gobl, et al., "ARIDEM—a multi-service broadband access demonstrator," Ericsson Review No. 3, 1996, 7 pgs.
Gordon, Notice of Allowance, U.S. Appl. No. 12/008,697, Mar. 20, 2014, 10 pgs.
Gordon, Final Office Action, U.S. Appl. No. 12/008,722, Mar. 30, 2012, 16 pgs.
Gordon, Final Office Action, U.S. Appl. No. 12/035,236, Jun. 11, 2014, 14 pgs.
Gordon, Final Office Action, U.S. Appl. No. 12/035,236, Jul. 22, 2013, 7 pgs.
Gordon, Final Office Action, U.S. Appl. No. 12/035,236, Sep. 20, 2011, 8 pgs.
Gordon, Final Office Action, U.S. Appl. No. 12/035,236, Sep. 21, 2012, 9 pgs.
Gordon, Final Office Action, U.S. Appl. No. 12/008,697, Mar. 6, 2012, 48 pgs.
Gordon, Office Action, U.S. Appl. No. 12/035,236, Mar. 13, 2013, 9 pgs.
Gordon, Office Action, U.S. Appl. No. 12/035,236, Mar. 22, 2011, 8 pgs.
Gordon, Office Action, U.S. Appl. No. 12/035,236, Mar. 28, 2012, 8 pgs.
Gordon, Office Action, U.S. Appl. No. 12/035,236, Dec. 16, 2013, 11 pgs.
Gordon, Office Action, U.S. Appl. No. 12/008,697, Aug. 1, 2013, 43 pgs.
Gordon, Office Action, U.S. Appl. No. 12/008,697, Aug. 4, 2011, 39 pgs.
Gordon, Office Action, U.S. Appl. No. 12/008,722, Oct. 11, 2011, 16 pgs.
Handley et al, "TCP Congestion Window Validation," RFC 2861, Jun. 2000, Network Working Group, 22 pgs.
Henry et al. "Multidimensional Icons" ACM Transactions on Graphics, vol. 9, No. 1 Jan. 1990, 5 pgs.
Insight advertisement, "In two years this is going to be the most watched program on TV" on touch VCR programming, published not later than 2000, 10 pgs.
Isensee et al., "Focus Highlight for World Wide Web Frames," Nov. 1, 1997, IBM Technical Disclosure Bulletin, vol. 40, No. 11, pp. 89-90.
ICTV, Inc., International Search Report / Written Opinion, PCT/US2008/000400, Jul. 14, 2009, 10 pgs.
ICTV, Inc., International Search Report / Written Opinion, PCT/US2008/000450, Jan. 26, 2009, 9 pgs.
Kato, Y., et al., "A Coding Control algorithm for Motion Picture Coding Accomplishing Optimal Assignment of Coding Distortion to Time and Space Domains," Electronics and Communications in Japan, Part 1, vol. 72, No. 9, 1989, 11 pgs.
Koenen, Rob,"MPEG-4 Overview—Overview of the MPEG-4 Standard" Internet Citation, Mar. 2001, http://mpeg.telecomitalialab.com/standards/mpeg-4/mpeg-4.htm, May 9, 2002, 74 pgs.
Konaka, M. et al., "Development of Sleeper Cabin Cold Storage Type Cooling System," SAE International, The Engineering Society for Advancing Mobility Land Sea Air and Space, SAE 2000 World Congress, Detroit, Michigan, Mar. 6-9, 2000, 7 pgs.
Le Gall, Didier, "MPEG: A Video Compression Standard for Multimedia Applications", Communication of the ACM, vol. 34, No. 4, Apr. 1991, New York, NY, 13 pgs.
Langenberg, E, et al., "Integrating Entertainment and Voice on the Cable Network," SCTE , Conference on Emerging Technologies, Jan. 6-7, 1993, New Orleans, Louisiana, 9 pgs.
Large, D., "Tapped Fiber vs. Fiber-Reinforced Coaxial CATV Systems", IEEE LCS Magazine, Feb. 1990, 7 pgs.
Mesiya, M.F, "A Passive Optical/Coax Hybrid Network Architecture for Delivery of CATV, Telephony and Data Services," 1993 NCTA Technical Papers, 7 pgs.
"MSDL Specification Version 1.1" International Organisation for Standardisation Organisation Internationale EE Normalisation, ISO/IEC JTC1/SC29/VVG11 Coding of Moving Pictures and Autdio, N1246, MPEG96/Mar. 1996, 101 pgs.
Noguchi, Yoshihiro, et al., "MPEG Video Compositing in the Compressed Domain," IEEE International Symposium on Circuits and Systems, vol. 2, May 1, 1996, 4 pgs.
Regis, Notice of Allowance U.S. Appl. No. 13/273,803, Sep. 2, 2014, 8 pgs.
Regis, Notice of Allowance U.S. Appl. No. 13/273,803, May 14, 2014, 8 pgs.
Regis, Final Office Action U.S. Appl. No. 13/273,803, Oct. 11, 2013, 23 pgs.
Regis, Office Action U.S. Appl. No. 13/273,803, Mar. 27, 2013, 32 pgs.
Richardson, Ian E.G., "H.264 and MPEG-4 Video Compression, Video Coding for Next-Genertion Multimedia," Johm Wiley & Sons, US, 2003, ISBN: 0-470-84837-5, pp. 103-105, 149-152, and 164.
Rose, K., "Design of a Switched Broad-Band Communications Network for Interactive Services," IEEE Transactions on Communications, vol. com-23, No. 1, Jan. 1975, 7 pgs.
Saadawi, Tarek N., "Distributed Switching for Data Transmission over Two-Way CATV", IEEE Journal on Selected Areas in Communications, vol. Sac-3, No. 2, Mar. 1985, 7 pgs.
Schrock, "Proposal for a Hub Controlled Cable Television System Using Optical Fiber," IEEE Transactions on Cable Television, vol. CATV-4, No. 2, Apr. 1979, 8 pgs.
Sigmon, Notice of Allowance, U.S. Appl. No. 13/311,203, Sep. 22, 2014, 5 pgs.

(56) References Cited

OTHER PUBLICATIONS

Sigmon, Notice of Allowance, U.S. Appl. No. 13/311,203, Feb. 27, 2014, 14 pgs.
Sigmon, Final Office Action, U.S. Appl. No. 13/311,203, Sep. 13, 2013, 20 pgs.
Sigmon, Office Action, U.S. Appl. No. 13/311,203, May 10, 2013, 21 pgs.
Smith, Brian C., et al., "Algorithms for Manipulating Compressed Images," IEEE Computer Graphics and Applications, vol. 13, No. 5, Sep. 1, 1993, 9 pgs.
Smith, J. et al., "Transcoding Internet Content for Heterogeneous Client Devices" Circuits and Systems, 1998. ISCAS '98. Proceedings of the 1998 IEEE International Symposium on Monterey, CA, USA May 31-Jun. 3, 1998, New York, NY, USA,IEEE, US, May 31, 1998, 4 pgs.
Stoll, G. et al., "GMF4iTV: Neue Wege zur-Interaktivitaet Mit Bewegten Objekten Beim Digitalen Fernsehen," Fkt Fernseh Und Kinotechnik, Fachverlag Schiele & Schon GmbH, Berlin, DE, vol. 60, No. 4, Jan. 1, 2006, ISSN: 1430-9947, 9 pgs.
Tamitani et al., "An Encoder/Decoder Chip Set for the MPEG Video Standard," 1992 IEEE International Conference on Acoustics, vol. 5, Mar. 1992, San Francisco, CA, 4 pgs.
Terry, Jack, "Alternative Technologies and Delivery Systems for Broadband ISDN Access", IEEE Communications Magazine, Aug. 1992, 7 pgs.
Thompson, Jack, "DTMF-TV, The Most Economical Approach to Interactive TV," Gnostech Incorporated, NCF'95 Session T-38-C, 8 pgs.
Thompson, John W. Jr., "The Awakening 3.0: PCs, TSBs, or DTMF-TV—Which Telecomputer Architecture is Right for the Next Generations's Public Network?," GNOSTECH Incorporated, 1995 The National Academy of Sciences, downloaded from the Unpredictable Certainty: White Papers, http://www.nap.edu/catalog/6062.html, pp. 546-552.
Tobagi, Fouad A., "Multiaccess Protocols in Packet Communication Systems," IEEE Transactions on Communications, vol. Com-28, No. 4, Apr. 1980, 21 pgs.
Toms, N., "An Integrated Network Using Fiber Optics (Info) for the Distribution of Video, Data, and Telephone in Rural Areas," IEEE Transactions on Communication, vol. Com-26, No. 7, Jul. 1978, 9 pgs.
Trott, A., et al."An Enhanced Cost Effective Line Shuffle Scrambling System with Secure Conditional Access Authorization," 1993 NCTA Technical Papers, 11 pgs.
Jurgen_Two-way applications for cable television systems in the '70s, IEEE Spectrum, Nov. 1971, 16 pgs.
va Beek, P., "Delay-Constrained Rate Adaptation for Robust Video Transmission over Home Networks," Image Processing, 2005, ICIP 2005, IEEE International Conference, Sep. 2005, vol. 2, No. 11, 4 pgs.
Van der Star, Jack A. M., "Video on Demand Without Compression: A Review of the Business Model, Regulations and Future Implication," Proceedings of PTC'93, 15th Annual Conference, 12 pgs.
Welzenbach et al., "The Application of Optical Systems for Cable TV," AEG-Telefunken, Backnang, Federal Republic of Germany, ISSLS Sep. 15-19, 1980, Proceedings IEEE Cat. No. 80 CH1565-1, 7 pgs.
Yum, TS P., "Hierarchical Distribution of Video with Dynamic Port Allocation," IEEE Transactions on Communications, vol. 39, No. 8, Aug. 1, 1991, XP000264287, 7 pgs.
ActiveVideo Networks, Inc., International Preliminary Report on Patentablity, PCT/US2013/036182, Oct. 14, 2014, 9 pgs.
ActiveVideo Networks Inc., Communication Pursuant to Rule 94(3), EP08713106-6, Jun. 25, 2014, 5 pgs.
ActiveVideo Networks Inc., Communication Pursuant to Rules 161(2) & 162 EPC, EP13775121.0, Jan. 20, 2015, 3 pgs.
ActiveVideo Networks Inc., Examination Report No. 1, AU2011258972, Jul. 21, 2014, 3 pgs.
ActiveVideo Networks Inc., Certificate of Patent JP5675765, Jan. 9, 2015, 3 pgs.
Brockmann, Notice of Allowance, U.S. Appl. No. 13/445,104, Dec. 24, 2014, 14 pgs.
Brockmann, Office Action, U.S. Appl. No. 13/668,004, Feb. 26, 2015, 17 pgs.
Brockmann, Office Action, U.S. Appl. No. 13/686,548, Jan. 5, 2015, 12 pgs.
Brockmann, Office Action, U.S. Appl. No. 13/911,948, Dec. 26, 2014, 12 pgs.
Brockmann, Office Action, U.S. Appl. No. 13/911,948, Jan. 29, 2015, 11 pgs.
Dahlby, Office Action, U.S. Appl. No. 12/651,203, Dec. 3, 2014, 19 pgs.
Gordon, Notice of Allowance, U.S. Appl. No. 12/008,697, Dec. 8, 2014, 10 pgs.
Gordon, Office Action, U.S. Appl. No. 12/008,722, Nov. 28, 2014, 18 pgs.
Regis, Notice of Allowance, U.S. Appl. No. 13/273,803, Nov. 18, 2014, 9 pgs.
Regis, Notice of Allowance, U.S. Appl. No. 13/273,803, Mar. 2, 2015, 8 pgs.
Sigmon, Notice of Allowance, U.S. Appl. No. 13/311,203, Dec. 19, 2014, 5 pgs.
TAG Networks Inc, Decision to Grant a Patent, JP 2008-506474, Oct. 4, 2013, 5 pgs.
ActiveVideo Networks Inc., Decision to refuse a European patent application (Art. 97(2) EPC, EP09820936.4, Feb. 20, 2015, 4 pgs.
ActiveVideo Networks Inc., Communication Pursuant to Article 94(3) EPC, 10754084.1, Feb. 10, 2015, 12 pgs.
ActiveVideo Networks Inc., Communication under Rule 71(3) EPC, Intention to Grant, EP08713106.6, Feb. 19, 2015, 12 pgs.
ActiveVideo Networks Inc., Notice of Reasons for Rejection, JP2014-100460, Jan. 15, 2015, 6 pgs.
ActiveVideo Networks Inc., Notice of Reasons for Rejection, JP2013-509016, Dec. 24, 2014 (Received Jan. 14, 2015), 11 pgs.
Brockmann, Office Action, U.S. Appl. No. 13/737,097, Mar. 16, 2015, 18 pgs.
Craig, Decision on Appeal—Reversed—, U.S. Appl. No. 11/178,177, Feb. 25, 2015, 7 pgs.
Craig, Notice of Allowance, U.S. Appl. No. 11/178,177, Mar. 5, 2015, 7 pgs.
Craig, Notice of Allowance, U.S. Appl. No. 11/178,181, Feb. 13, 2015, 8 pgs.
ActiveVideo Networks, Inc., Certificate of Grant, EP08713106.6-1908, Aug. 5, 2015, 2 pgs.
ActiveVideo Networks, Inc., Certificate of Grant, AU2011258972, Nov. 19, 2015, 2 pgs.
ActiveVideo Networks, Inc., Certificate of Grant, AU2011315950, Dec. 17, 2015, 2 pgs.
ActiveVideo Networks, Inc., Certificate of Grant, AU2011249132, Jan. 7, 2016, 2 pgs.
ActiveVideo Networks, Inc., Certificate of Grant EP13168509.11908, Sep. 30, 2015, 2 pgs.
ActiveVideo Networks, Inc., Certificate of Patent, JP2013534034, Jan. 8, 2016, 4 pgs.
ActiveVideo Networks, Inc., Communication Pursuant to Rules 161(1) and 162 EPC, EP14722897.7, Oct. 28, 2015, 2 pgs.
ActiveVideo Networks, Inc., Communication Pursuant to Rules 161(1) and 162 EPC, EP14740004.8, Jan. 26, 2016, 2 pgs.
ActiveVideo Networks, Inc., Communication Pursuant to Rules 161(1) and 162 EPC, EP14736535.7, Jan. 26, 2016, 2 pgs.
ActiveVideo, Communication Pursuant to Article-94(3) EPC, EP12767642.7, Sep. 4, 2015, 4 pgs.
AcriveVideo, Communication Pursuant to Article 94(3) EPC, EP10841764.3, Dec. 18, 2015, 6 pgs.
ActiveVideo Networks, Inc., Communication Pursuant to Rules 70(2) abd 70a(2) EP13735906.3, Nov. 27, 2015, 1 pg.
ActiveVideo Networks, Inc., Decision to Grant, EP08713106.6-1908, Jul. 9, 2015, 2 pgs.
ActiveVideo Networks, Inc., Decision to Grant, EP13168509.1-1908, Sep. 3, 2015, 2 pgs.
ActiveVideo Networks, Inc., Decision to Grant, JP2014100460, Jul. 24, 2015, 5 pgs.

(56) References Cited

OTHER PUBLICATIONS

ActiveVideo Networks, Inc., Decision to Refuse a European Patent Application, EP08705578.6, Nov. 26, 2015, 10 pgs.
ActiveVideo Networks Inc., Examination Report No. 2, AU2011249132, May 29, 2015, 4 pgs.
ActiveVideo Networks Inc., Examination Report No. 2, AU2011315950, Jun. 25, 2015, 3 pgs.
ActiveVideo Networks Inc., Extended European Search Report, EP13735906.3, Nov. 11, 2015, 10 pgs.
ActiveVideo, International Search Report and Written Opinion, PCT/US2015/027803, Jun. 24, 2015, 18 pgs.
ActiveVideo, International Search Report and Written Opinion, PCT/US2015/027804, Jun. 25, 2015, 10 pgs.
ActiveVideo Networks, Inc., International Search Report and Written Opinion, PCT-US2015028072, Aug. 7, 2015, 9 pgs.
ActiveVideo Networks, Inc., International Preliminary Report on Patentability, PCT-US2014030773, Sep. 15, 2015, 6 pgs.
ActiveVideo Networks, Inc., International Preliminary Report on Patentability, PCT/US2014041430, Dec. 8, 2015, 6 pgs.
ActiveVideo Networks, Inc., International Preliminary Report on Patentability, PCT-US2014041416, Dec. 8, 2015, 6 pgs.
ActiveVideo Networks, Inc., KIPO'S Notice of Preliminary Rejection, KR10-2010-7019512, Jul. 15, 2015, 15 pgs.
ActiveVideo Networks, Inc., KIPO'S Notice of Preliminary Rejection, KR10-20107021116, Jul. 13, 2015, 19 pgs.
ActiveVideo, Notice of Reasons for Rejection, JP2013-509016, Dec. 3, 2015, 7 pgs.
ActiveVideo, Notice of German Patent, EP602008040474-9, Jan. 6, 2016, 4 pgs.
ActiveVideo Networks B.V., Office Action, IL222830, Jun. 28, 2015, 7 pgs.
ActiveVideo Networks, Inc., Office Action, JP2013534034, Jun. 16, 2015, 6 pgs.
Avinity-Systems-BV, PreTrial-Reexam-Report-JP2009530298, Apr. 24, 2015, 6 pgs.
Brockmann, Notice of Allowance, U.S. Appl. No. 13/911,948, Jul. 10, 2015, 5 pgs.
Brockmann, Notice of Allowance, U.S. Appl. No. 13/438,617, May 22, 2015, 18 pgs.
Brockmann, Notice of Allowance, U.S. Appl. No. 13/445,104, Apr. 23, 2015, 8 pgs.
Brockmann, Notice of Allowance, U.S. Appl. No. 14/262,674, Sep. 30, 2015, 7 pgs.
Brockmann, Notice of Allowance, U.S. Appl. No. 13/911,948, Aug. 21, 2015, 6 pgs.
Brockmann, Notice of Allowance, U.S. Appl. No. 13/911,948, Aug. 5, 2015, 5 pgs.
Brockmann, Final Office Action, U.S. Appl. No. 12/443,571, Jul. 9, 2015, 28 pgs.
Brockmann, Final Office Action, U.S. Appl. No. 13/668,004, Aug. 3, 2015, 18 pgs.
Brockmann, Final Office Action, U.S. Appl. No. 13/686,548, Aug. 12, 2015, 13 pgs.
Brockmann, Final Office Action, U.S. Appl. No. 13/737,097, Aug. 14, 2015, 17 pgs.
Brockmann, Office Action, U.S. Appl. No. 14/262,674, May 21, 2015, 7 pgs.
Brockmann, Office Action, U.S. Appl. No. 12/443,571, Dec. 4, 2015, 30 pgs.
Dahlby, Office Action U.S. Appl. No. 12/651,203, Jul. 2, 2015, 25 pgs.
Dahlby, Final Office Action, U.S. Appl. No. 12/651,203, Dec. 11, 2015, 25 pgs.
Gecsei, J., "Adaptation in Distributed Multimedia Systems," IEEE Multimedia, IEEE Service Center, New York, NY, vol. 4, No. 2, Apr. 1, 1997, 10 pgs.
Gordon, Notice of Allowance, U.S. Appl. No. 12/008,697, Apr. 1, 2015, 10 pgs.
Gordon, Final Office Action, U.S. Appl. No. 12/008,722, Jul. 2, 2015, 20 pgs.
Jacob, Bruce, "Memory Systems: Cache, DRAM, Disk," The Cache Layer, Chapter 22, p. 739.
Ohta, K., et al., "Selective Multimedia Access Protocol for Wireless Multimedia Communication," Communications, Computers and Signal Processing, 1997, IEEE Pacific Rim Conference NCE Victoria, BC, Canada, Aug. 1997, vol. 1, 4 pgs.
Sigmon, Notice of Allowance, U.S. Appl. No. 13/311,203, Apr. 14, 2015, 5 pgs.
Wei, S., "QoS Tradeoffs Using an Application-Oriented Transport Protocol (AOTP) for Multimedia Applications Over IP." Sep. 23-26 1999, Proceedings of the Third International Conference on Computational Intelligence and Multimedia Applications, New Delhi, India, 5 pgs.
ActiveVideo Networks, Inc., KIPO's Notice of Preliminary Rejection, KR10-2011-7024417, Feb. 18, 2016, 15 pgs.
ActiveVideo Networks, Inc., KIPO's Second Notice of Preliminary Rejection, KR10-20107019512, Feb. 12, 2016, 5 pgs.
Brockmann, Office Action, U.S. Appl. No. 13/686,548, Feb. 8, 2016, 13 pgs.
Gordon, Notice of Allowance, U.S. Appl. No. 12/008,722, Feb. 17, 2016, 10 pgs.
McElhatten, Office Action, U.S. Appl. No. 14/698,633, Feb. 22, 2016, 14 pgs.

\* cited by examiner

OVERLAY RENDERING OF USER INTERFACE ONTO SOURCE VIDEO

RELATED APPLICATIONS

This application claims priority to U.S. Provisional Patent Application No. 61/832,069, entitled "Overlay Rendering of User Interface Onto Source Video," filed Jun. 6, 2013, which is incorporated by reference herein in its entirety.

TECHNICAL FIELD

The present invention relates to interactive video distribution systems, and more particularly to blending a source video with an interactive user interface to generate a single image, where the source video and interactive user interface are separately provided.

BACKGROUND ART

It is known in the prior art to provide interactive user interfaces for television programs. Such interactive user interfaces include, for example, electronic program guides (EPG) that may be manipulated to search for broadcast programs or schedule recordings. Interactive user interfaces also include simple video games, menuing systems to access video on demand, and other similar such mechanisms.

Interactive user interfaces may be combined with source video, such as video on a broadcast or cable channel. There are two broad ways to combine such interfaces with source video: scale down the source video and fill the rest of the screen with the interactive user interface, or keep the source video full-screen but overlay the user interface onto the screen. As an example of the first combination, modern EPGs often show dynamically-generated channel information with a small preview window that shows video for a current channel. As an example of the second combination, television sets often provide volume controls as elements that overlay an area of the screen, typically near the bottom or along one side, while continuing to display the underlying source video content full-screen.

The latter method to combine user interfaces with source video can itself be broken into two different categories: opaque user interfaces and translucent, or partially transparent, user interfaces. Different techniques can be used for these different categories. For example, if it is known in advance that a user interface will be opaque, then the pixels of the underlying source video content may be discarded at the beginning of the overlay process. This ability to discard pixels simplifies processing of the overlays and permits compositing of the user interface directly into the source image. For certain block-based encoding schemes, compositing can be accomplished at a block level. However, for partially transparent user interfaces, the underlying pixels must be retained and blended with the user interface.

It is also known in the art to overlay images using blending. For purposes of the present disclosure, "blending" refers to a process of alpha compositing; that is, the process of combining two colors using a transparency coefficient, a. Using this technique, each pixel of each image may be viewed as being associated with four values: three color values and one alpha value, each between 0.0 and 1.0, either by storing these values per pixel or in a lookup table such as for example a palette. If the color values are red-green-blue, for example, then these four values are denoted RGBA. Alpha blending takes as input the RGBA values of a foreground pixel and a background pixel, and produces as output a pixel having RGBA values color(output)=$\alpha(f)$*color(f)+(1−$\alpha(f)$)*color(b) and $\alpha$(output)=$\alpha(f)$+$\alpha(b)$*(1−$\alpha(f)$), where $\alpha(f)$ and $\alpha(b)$ are the transparency coefficients of the foreground and background pixels, respectively. In other words, the colors and transparency coefficients of the output are a weighted average of the foreground and background pixel, using "$\alpha$" as the weight. Thus, if $\alpha$=0.0 in the foreground pixel, then the colors in the output pixel are the same as that of the background (that is, the foreground pixel is not visible). If $\alpha$ is increased from 0.0 toward 1.0, more of the foreground pixel becomes visible, until when $\alpha$=1.0 the color of the output pixel is the same as that of the foreground pixel (that is, the background pixel is completely overlaid by the foreground pixel).

However, it is generally disadvantageous to blend user interfaces at the server (e.g., at a cable headend), for a number of reasons. First, a typical television provider will have hundreds of thousands or millions of subscribers, a significant portion of whom will, at any given time, require interactive user interfaces. Each subscriber may be watching a different source video, and blending all of these source videos with any number of user interfaces is a problem that does not scale well. Second, blending a user interface with a source video requires access to the pixels of the source video, but the source video that is broadcast is typically ingested from a content provider, encoded according to a transmission encoding that exceeds available computational power. Third, a significant latency may be caused by the blending process, creating an unacceptable 'sluggishness' in the response of the user interface.

SUMMARY OF THE EMBODIMENTS

Various embodiments of the invention overcome the disadvantages of blending, at the server, interactive user interfaces with underlying source video in two distinct ways. First, many client devices, such as set top boxes or smart televisions, have the ability to perform alpha blending. Thus, it is possible to transmit the user interface from a remote server, such as one found at a cable headend, to the client device, on demand and out-of-band using a separate protocol, such as a modified RFB or XRT protocol. Second, even if a client device does not have the ability to perform alpha blending locally, such blending can be accelerated at the remote server through a combination of image caching and reconstruction of the client device decoder state to the point where blending becomes a scalable operation.

Some implementations include a method of providing, at a client device, an interactive user interface for generating an output, for a display, that includes a source video and an interactive user interface. The method includes receiving, at a client device remote from a server, the source video from the server using a first data communications channel configured to communicate video content, wherein the first data communications channel comprises a quadrature amplitude modulation (QAM) protocol. Furthermore, the method includes transmitting to the server a command related to an interactive user interface, and receiving, in response to the transmitting, one or more images of the interactive user interface using a second data communications channel different from the first data communications channel, wherein the second data communications channel comprises a transmission control protocol over internet protocol (TCP/IP) protocol. The source video is blended with the received one or more images to generate an output, and the output is transmitted toward a display device for display thereon.

In some embodiments, the interactive user interface comprises a menu.

In some embodiments, the received video content is encoded using an MPEG specification, an AVS specification, or a VC-1 specification. Furthermore, in some embodiments, the one or more images of the interactive user interface are encoded using a bitmap (BMP) file format, a portable network graphics (PNG) file format, a joint photographic experts group (JPEG) file format, or a graphics interchange format (GIF) file format.

In some embodiments, each image of the one or more images is associated with a corresponding transparency coefficient, and wherein blending the source video with the received one or more images comprises blending according to the transparency coefficient.

In some embodiments, wherein the blending comprises blending in a spatial domain.

In another aspect, a method includes providing, at a server, an interactive user interface for generating a output, for a display, that includes the interactive user interface and a source video. The method includes transmitting frames of a source video toward a client device, remote from the server, using a data communications channel configured to communicate video content, while simultaneously buffering in a memory of the server a plurality of encoded frames from the source video for subsequent transmission to the client device. The buffered frames include a first frame that is intra-encoded and one or more additional frames that are inter-encoded based on the first frame. Responsive to receiving from the client device a command that relates to the interactive user interface, the method includes determining a buffered frame in the plurality of buffered frames that corresponds to a time associated with the command, and blending the determined frame with one or more images of the interactive user interface to generate an output. Using the data communications channel, the output is transmitted toward the client device for display on the display device.

In some embodiments, transmitting the frames of the source video and transmitting the output frame each comprise transmitting according to a screen resolution or a screen dimension of the display device.

In some embodiments, the interactive user interface comprises a menu.

In some embodiments, the encoding specification is an MPEG specification, an AVS specification, or a VC-1 specification. Furthermore, in some embodiments, the one or more images of the interactive user interface are encoded using a bitmap (BMP) file format, a portable network graphics (PNG) file format, a joint photographic experts group (JPEG) file format, or a graphics interchange format (GIF) file format.

In some embodiments, the data communications channel comprises at least one of: quadrature amplitude modulation (QAM) using a cable network infrastructure, user datagram protocol over internet protocol (UDP/IP) using an internet protocol television (IPTV) infrastructure, or hypertext transfer protocol (HTTP) using a public or private internet infrastructure.

In some embodiments, each image of the one or more images is associated with a corresponding transparency coefficient, and wherein blending the determined frame with the one or more images comprises blending according to the transparency coefficient.

In some embodiments, blending the determined frame with one or more images includes (i) decoding the determined frame according to the encoding specification to generate a decoded frame; (ii) blending the decoded frame with the one or more images in a spatial domain to generate a blended frame; and (iii) encoding the blended frame according to the encoding specification to generate the output frame. Furthermore, in some implementations, encoding the blended frame comprises searching for motion vectors.

In some embodiments, the output frame is encoded according to the encoding specification.

In yet another aspect, a method includes combining, at a client device, an interactive user interface for generating a blended output, for a display, that includes the interactive user interface and one or more supplemental images. The method includes receiving, at a client device remote from a server, an interactive user interface from the server using a first data communications channel configured to communicate video content. Furthermore, the method includes transmitting to the server a command that relates to an interactive user interface, and receiving, in response to the transmitting, an updated user interface from the server using the first data communications channel, and the one or more supplemental images for supplementing the interactive user interface using a second data communications channel different from the first data communications channel. The updated user interface and the one or more supplemental images are blended to generate a blended output, and the blended output is transmitted toward the display device for display thereon.

In some embodiments, the interactive user interface comprises a source video stitched with user interface content.

In some embodiments, the encoding specification is an MPEG specification, an AVS specification, or a VC-1 specification.

In some embodiments, the first data communications channel comprises at least one of: quadrature amplitude modulation (QAM) using a cable network infrastructure, user datagram protocol over internet protocol (UDP/IP) using an internet protocol television (IPTV) infrastructure, or hypertext transfer protocol (HTTP) using a public or private internet infrastructure.

In some embodiments, the one or more supplemental images are encoded using a bitmap (BMP) file format, a portable network graphics (PNG) file format, a joint photographic experts group (JPEG) file format, or a graphics interchange format (GIF) file format.

In some embodiments, the second data communications channel comprises at least one of transmission control protocol over internet protocol (TCP/IP), remote frame buffer (RFB) protocol, and extended remoting technology (XRT) protocol.

In some embodiments, each supplemental image of the one or more supplemental images is associated with a corresponding transparency coefficient, and wherein blending the updated user interface with the one or more supplemental images comprises blending according to the transparency coefficient.

In some embodiments, blending comprises blending in a spatial domain.

In some embodiments, the command is a request for secure content, wherein the one or more supplemental images are received from a third party server, and the second data communications channel uses a secure transport protocol.

In yet another aspect, the method includes providing, at a server, an interactive user interface for generating a blended output, for a display, that includes the interactive user interface and one or more supplemental images. The method includes transmitting, at a server remote from a client device, the interactive user interface from a server using a first data communications channel configured to communicate video content, and receiving a command that relates to the interactive user interface. Furthermore, the method includes generating an updated interactive user interface, blending the updated user interface and the one or more supplemental images to generate a blended output frame, and transmitting the blended output frame toward a client device for display on a display device thereon.

In some embodiments, the method further includes transmitting the updated interactive user interface toward the client device for display on the display device thereon, and switching between transmitting the blended output frame and transmitting the updated interactive user interface.

In some embodiments, the encoding specification is an MPEG specification, an AVS specification, or a VC-1 specification.

In some embodiments, the first data communications channel comprises at least one of: quadrature amplitude modulation (QAM) using a cable network infrastructure, user datagram protocol over internet protocol (UDP/IP) using an internet protocol television (IPTV) infrastructure, or hypertext transfer protocol (HTTP) using a public or private internet infrastructure.

In some embodiments, the image format of the one or more supplemental images is a bitmap (BMP) file format, a portable network graphics (PNG) file format, a joint photographic experts group (JPEG) file format, or a graphics interchange format (GIF) file format.

In some embodiments, the method includes first determining that the client device is not capable of overlaying.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions

As used in this description and the accompanying claims, the following terms shall have the meanings indicated, unless the context otherwise requires:

"Video" means both silent moving images and moving images accompanied by sound, except where otherwise indicated.

An "encoding specification" is a specification according to which video data are encoded by a transmitting electronic device and decoded by a receiving electronic device. Examples of encoding specifications are MPEG-2, MPEG-4, AVS, and VC-1.

A "client device" is an electronic device capable of receiving and decoding data according to an encoding specification for display on a display device. Examples of client devices include cable and satellite set top boxes, some video game consoles, and some televisions.

Figure 1:
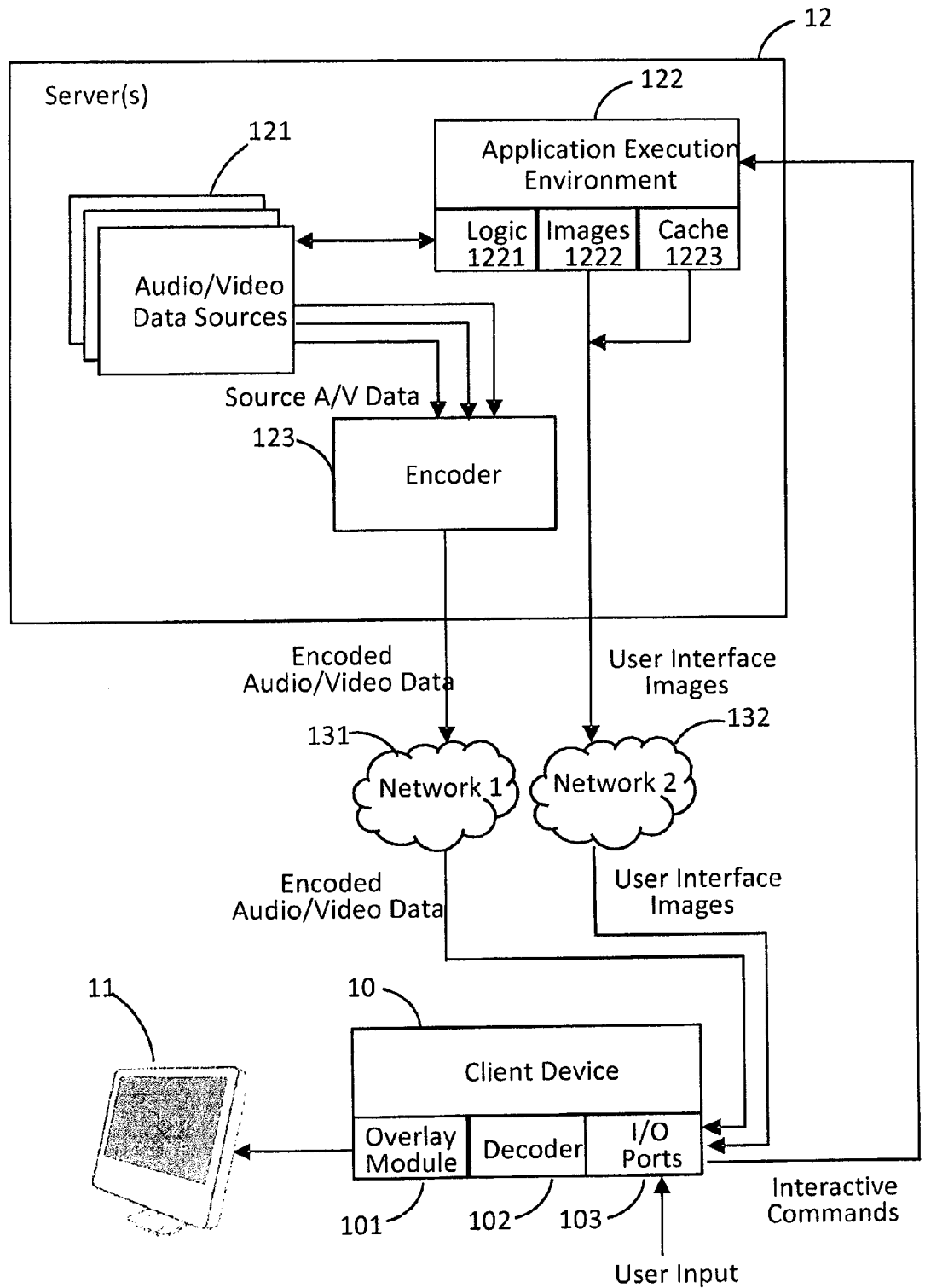
FIG. 1 schematically shows a system in accordance with one embodiment of the invention.

FIG. 1 schematically shows a system in accordance with one embodiment of the invention. This embodiment includes a client device 10 that provides an output display signal to a display device 11. The client device 10 generally receives signals, such as linear broadcast television signals, from one or more servers 12, by way of a first data communications network 131. The client device 10 also receives images that form an interactive user interface, such as electronic program guide signals, by way of a second data communications network 132. The client device 10 then combines these signals to generate the output display signal. The aforementioned elements are now described in more detail.

The client device 10 may be implemented as a set top box, a video game console, a television, or other electronic device known in the art. The client device 10 includes an overlay module 101 that is capable of overlaying an image on an input video signal to generate an output video signal as a sequence of composite images. The operation of the overlay module 101 is described in more detail in connection with FIG. 2. The client device 10 also includes a video decoder 102, which is capable of decoding audiovisual data that was encoded according to an encoding specification. Such video decoders are well known in the art, and may be implemented as an integrated circuit. Audiovisual data typically are encoded to reduce size for transmission through the data communications network 131.

The client device 10 also has several input/output (I/O) ports 103. One I/O port 103 is used to receive audiovisual data from the data communications network 131, while another is used to receive images from the data communications network 132. Another I/O port may be used in some embodiments to receive images that comprise an interactive user interface. In other embodiments, the same I/O port is used to receive both the audiovisual data and the interactive user interface images. Another I/O port is used to accept user input in the form of commands. Some commands may instruct the client device 10 to tune to a different channel (i.e., to receive different audiovisual data from the data communications network 131 or from another data network such as the Internet). Other commands may instruct the client device to record audiovisual data, either as it arrives at the client device 10 or at a future time and on a specified channel. Some commands will cause the display of an interactive user interface, while other commands will not. Various embodiments of the present invention are directed toward processing of commands that cause the display of such a user interface. The I/O ports 103 may be implemented using hardware known in the art, such as an IR receiver to interface with a remote control, a coaxial jack to interface with a cable television distribution network, a wired or wireless Ethernet port to interface with an Ethernet network, a video jack to provide the output display signal to the display device 11, and so on. The display device 11 itself may be implemented as a standard CRT, LCD, LED, or plasma monitor as is known in the art, or other similar device.

The one or more servers 12 may be implemented using computer equipment known in the art; however their functions are novel when operated in accordance with various embodiments of the present invention. In accordance with some embodiments of the invention, a large number of servers 12 may be present, and cooperate to provide the functions described below. However, for convenience and clarity, the remainder of the detailed description will assume that only one server 12 is present.

The server 12 includes a number of audio, video, and/or audiovisual data sources 121, an application execution environment 122, and an encoder 123. Note that other components may be used in an implementation of the server 12, although these have been omitted for clarity. These components are now described in more detail.

The audio/video data sources 121 may be, for example, non-linear multimedia data stored on a non-volatile storage device in the form of a movie, television program, television commercial, game graphics and sounds, user interface sounds, or other such form. The data sources 121 also may include linear multimedia data sources, such as a television broadcast stream received live by antenna or private network.

An application execution environment 122 executes an interactive application on behalf of a user. The application may be, for example, a menuing system, a video game system, or other interactive application. The environment 122 responds to input interactive commands by providing images to the client device 10 using data communications network 132. The environment 122 includes at least application logic 1221, a source of images 1222, and an image cache 1223. Application logic 1221 may be implemented as an executable file or a script that provides a state machine for operating an interactive user interface. Any format of application file may be used as application logic 1221; for example, a hypertext markup language (HTML) file that includes JavaScript may be used, or a compiled binary file may be used.

The application logic 1221 may dynamically generate one or more images 1222 that comprise the interactive user interface. The images 1222 often persist in a volatile memory of the server 12 for speed of access, for example in an image cache 1223. The images 1222 may be generated by the application execution environment logic 1221 according to a screen resolution or a screen dimension of the display device 11, which may be statically configured or may be determined dynamically when the client device 10 first establishes a communications session with the server 12. Typically, for efficiency purposes, the application logic 1221 will transmit images from the image cache 1223 if possible, and dynamically create images 1222 for transmission only if they are not already in the image cache 1223. The use of a cache 1223 advantageously permits interactive user interface images to be reused by the server 12 (or by other servers) between different requests for the user interface, even if those requests come from different end users or at different times. Images in the image cache 1223 typically are indexed using a hashing function defined by the environment 122. The use of the hashing function permits many images to be quickly retrieved from the image cache 1223, advantageously providing increased scalability. Additionally and/or alternatively, in some embodiments, server(s) 12 will transmit references to the images (such as Uniform Resource Locators or URLs), as opposed to the images themselves, so that the client can retrieve them on demand (e.g., by means of HTTP). Such embodiments would be advantageous, as an intermediate network cache (not shown), accessible through second data communications channel 132, may be used to store reusable images closer to the client device.

The encoder 123 encodes the source audiovisual data according to an encoding specification, such as MPEG, AVS, or VC-1. The encoder 123 and the decoder 102 use the same encoding specification, so that the encoded audiovisual data may be decoded once it passes through the data communications network 131. In the case that the source audiovisual data are already encoded, the encoder acts as a simple passthrough. However, in the case that the source audiovisual data are not in a format decodable by the decoder 102, the encoder 123 transcodes the data into a decodable format.

As can be seen from FIG. 1, the encoded audiovisual data (from the encoder 123) and the user interface images (either from images 1222 or the cache 1223) travel to the client device along two different data channels. The first data channel through the first data communications network 131 is designed specifically to communicate video content. Thus, for example, the network 131 may include a cable network infrastructure that deploys quadrature amplitude modulation (QAM), as is known in the art. Alternately, the network 131 may have an internet protocol television (IPTV) infrastructure that uses user datagram protocol over internet protocol (UDP/IP) to communicate encoded video. In yet another implementation, the network 131 may be part of a public or private internet infrastructure, and use hypertext transfer protocol (HTTP) tunneling to communicate the encoded video.

By contrast, the second data communications network 132 may be designed to communicate images, rather than video. In particular, this means that the second network 132 may operate on a much lower bandwidth or a higher reliability than the first network 131. Thus, for example, the second network 132 may support data channels using the transmission control protocol over internet protocol (TCP/IP), the remote frame buffer (RFB) protocol, or the extended remoting technology (XRT) protocol. Images that are transmitted on the second network 132 may be encoded, for example, using a bitmap (BMP) file format, a portable network graphics (PNG) file format, a joint photographic experts group (JPEG) file format, or a graphics interchange format (GIF) file format. The use of PNG is particularly advantageous, as each pixel is stored with a corresponding transparency coefficient (a value).

Figure 2:
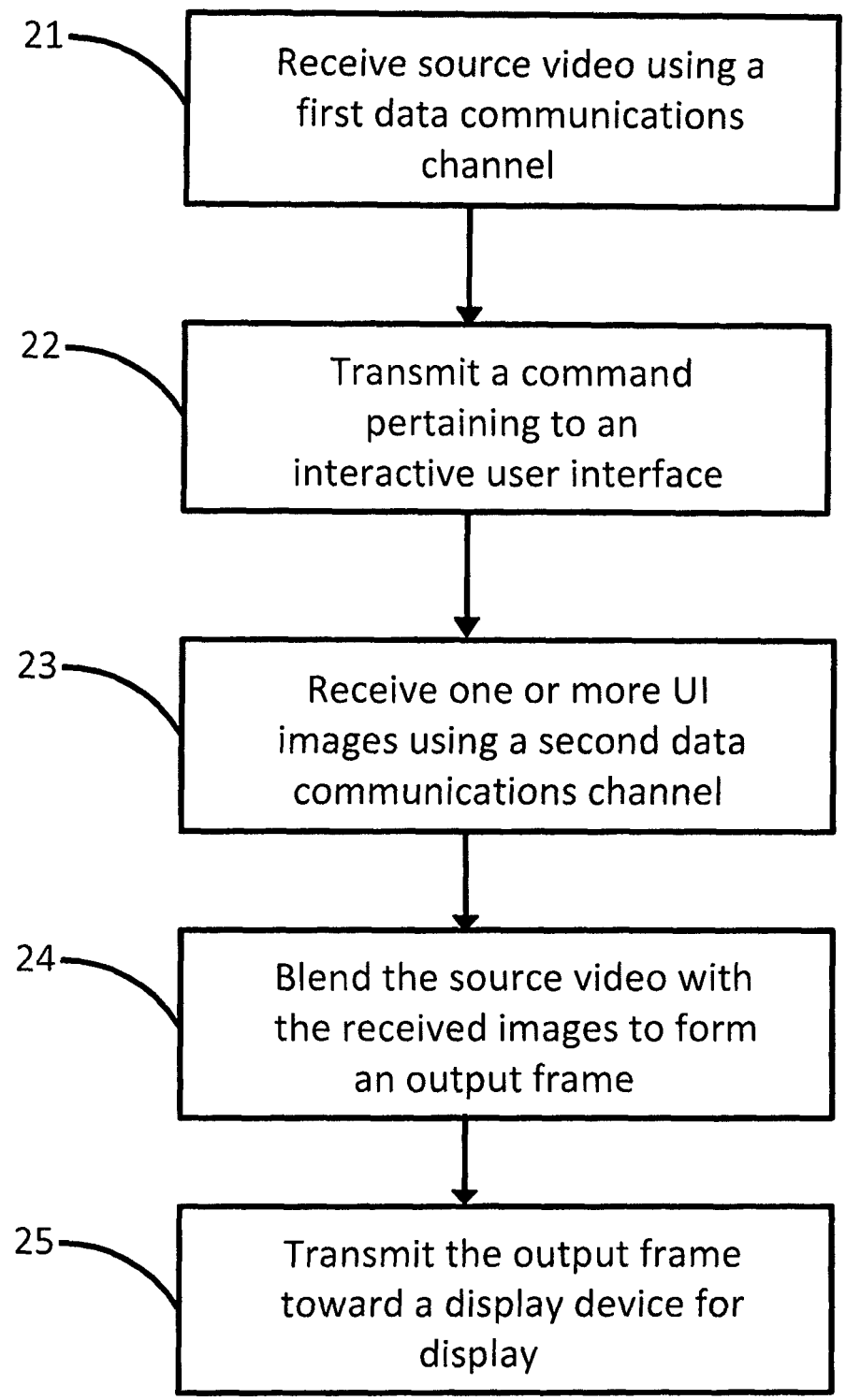
FIG. 2 is a flowchart showing operation of a client device in the system of FIG. 1.

FIG. 2 is a flowchart showing operation of a client device 10 in the system of FIG. 1 in accordance with an embodiment of the invention. In particular, FIG. 2 illustrates a method of providing, in the client device 10, an interactive user interface for simultaneous display with a source video on a display device 11. The method begins with a process 21 in which the client device 10 receives source video using a first data communications channel 131. In a typical embodiment, the client device 10 will display this source video as it arrives on the display device 11, as is known in the art. Next, in process 22 the client device 10 transmits a command related to an interactive user interface to a server 12. This command may be transmitted, for example, in response to the client device 10 receiving on an I/O port 103 a signal that a button or buttons on a remote control has been pressed. The button or buttons may be provided on the remote control to call up an interactive program guide, a video game, or other interactive application.

In process 23, the client device 10 responsively receives one or more images of the interactive user interface, using a second data communications channel 132. For example, the images might include a number of buttons, switches, or dials for collective simultaneous display as a user interface. Alternately, the images might be designed to be displayed sequentially, as in the case of a "trick play" interface that includes a video timeline and a mark indicating a current time stamp. Seeking through the video may be performed by pressing a fast-forward or rewind button on the remote control, and movement of the timing mark along the timeline typically may be sped up by repeated button presses. The images may come from the images 1222 or the image cache 1223 of the application execution environment 122.

Next, in a process 24, the client device 10, and in particular the overlay module 101, alpha blends the source video with the received images to generate an output frame of pixels. In accordance with various embodiments of the invention, the received interactive user interface images are considered to be partially transparent foreground images ($0.0 < \alpha < 1.0$), and frames of the source video are considered to be opaque background images ($\alpha = 1.0$). The choice of a for the user interface images advantageously may be made to be approximately 0.5, so that the interactive user interface appears evenly blended with the background source video. Or, the value of a may be varied on a per-pixel basis (i.e., per pixel alpha blending) within each image; for example, providing a downward a-gradient at the edges of a user interface image will produce an effect of the image 'fading into the background' at its edges. Global alpha blending and per pixel alpha blending may be combined by multiplying each per pixel alpha blending value with the global alpha blending value before the blending process is applied. The blending process 24 is performed using an appropriate received user interface image or images with respect to each frame of the source video for as long as the interactive user interface should be displayed on the screen, thereby providing a continuously-displayed interactive user interface.

Finally, in process 25, the client device 10 transmits each output frame toward the display device 11 for display. An I/O port 103 may be used in processes 21, 22, 23, 25 to receive or transmit data. A computing processor may be used in process 24 to perform the required blending.

The above embodiments are preferred because the image cache 1223 may be used to increase scalability of the content delivery platform provided by the server 12 (or a server cloud). This is true because it is feasible to cache individual user interface images separately from their underlying source videos, while it is generally infeasible to cache a vast number of pre-blended images due to limited storage space. The separate caching of user interface images, in turn, is a result of the ability of the client device 10 to receive these images using an I/O port 103 and perform blending in the overlay module 101.

In some situations, it may be impossible to use these embodiments, because a client device 10 may not have the necessary I/O ports 103 or an overlay module 101. In these situations, it is instead necessary to perform blending at the server 12, rather than the client 10, and such blending has its own challenges.

One such challenge is that the user interface images must be blended by the server 12, but can be sent to the client device 10 only as encoded audiovisual data. Therefore, it is necessary to decode the source video into a spatial domain (i.e., as a frame of pixels), blend the user interface images with the source video in the spatial domain, then re-encode the blended image according to the encoding specification. These processes require server computational capacity, and do not scale well.

Figure 3:
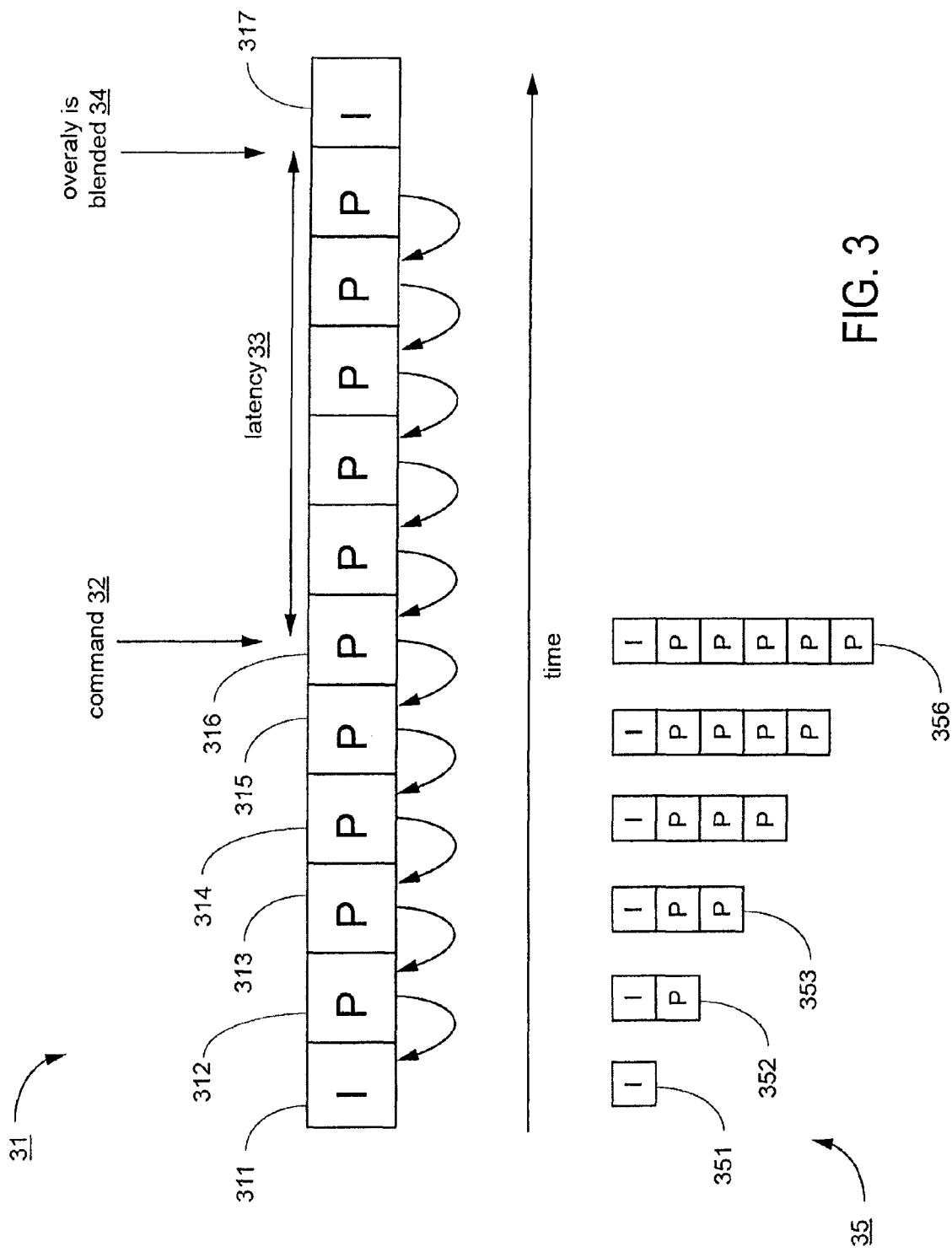
FIG. 3 schematically shows a sequence of frames of video in relation to an interactivity command in accordance with a second embodiment of the invention.

Another challenge is that there is noticeable latency between the time at which the interface command occurs and when the user interface can be displayed. This challenge is illustrated by consideration of FIG. 3, which schematically shows a time sequence 31 of frames of video in relation to an interactivity command 32. In this figure, a sequence 31 of frames includes a number of individual video frames 311-317. The frames are labeled by a frame type, which may be either intra-encoded or inter-encoded. An intra-encoded frame encodes video data according to data found only in the frame, while an inter-encoded frame encodes video data according to data found in the given frame and in surrounding frames. For purposes of clarity, MPEG frame types are used in the figures and detailed description to provide an example implementation, but any encoding specification may be used in accordance with an embodiment of the invention.

The sequence 31 of frames includes two types of frames: I-frames that are intra-encoded and P-frames that are inter-encoded. I-frames are encoded using image information found only in themselves. Thus, I-frames encode a full-screen image, which is useful to indicate a 'scene change' or to eliminate display artifacts. Two frames 311, 317 are I-frames. P-frames are encoded using information found in the previous image by estimating movement of pixels using two-dimensional "motion vectors". Thus, P-frames are useful for predicting movement fixed or slow-moving 'camera pan' images where most of the image content of the previous frame is present in the next frame. This relationship between P-frames and their predecessor frames is indicated by the backwards-facing arrows in FIG. 3. Frames 312-316 are P-frames. MPEG also defines a B-frame, not shown in FIG. 3, which interpolates both forward and backward between other frames.

Suppose an interface command 32 arrives at the server 12 when a P-frame 316 is being displayed on the display device 11. Because it is inter-encoded, the information in this P-frame is insufficient by itself to reconstruct the complete image being displayed (i.e., to reconstruct the decoder state). In fact, the information necessary is found in a combination of the frames 311-316. One could introduce a latency 33 between the time of the command 32 and the next I-frame 317, at which time the overlay image is blended 34. However, if the group of pictures 31 contains two seconds worth of source video, the average wait time from the command 32 to the next I-frame 317 (and the appearance of the user interface) is one second, which is unacceptably unresponsive. Therefore, in various embodiments of the invention, all of the data in each group of pictures 31 (that is, from one intra-encoded frame until the next one) are buffered in the server 12 before being transmitted to permit blending of the interactive user interface images with the currently-displayed image from the source video.

The server 12 uses buffered frames to simulate, for blending, the state of the decoder 102 in the client device 10. This process is illustrated by the sequence 35, in which an encoder in the server 12 constructs the state of the decoder 102. The server 12 retrieves the first frame 311 of the buffered frames, and uses it as an initial simulated state 351. The server 12 then retrieves the second frame 312 of the buffered frames, and applies its data to the initial simulated state 351 to obtain a second simulated state 352. The server 12 retrieves the third frame 313 of the buffered frames, and applies its data to the second simulated state 352 to obtain a third simulated state 353. This process continues until the simulation reaches a state 356 that corresponds to a frame 316 corresponding to a time associated with the command 32. Once the server 12 has recovered the state of the decoder 102, it may perform blending as described above in connection with element 24 of FIG. 2.

Figure 4:
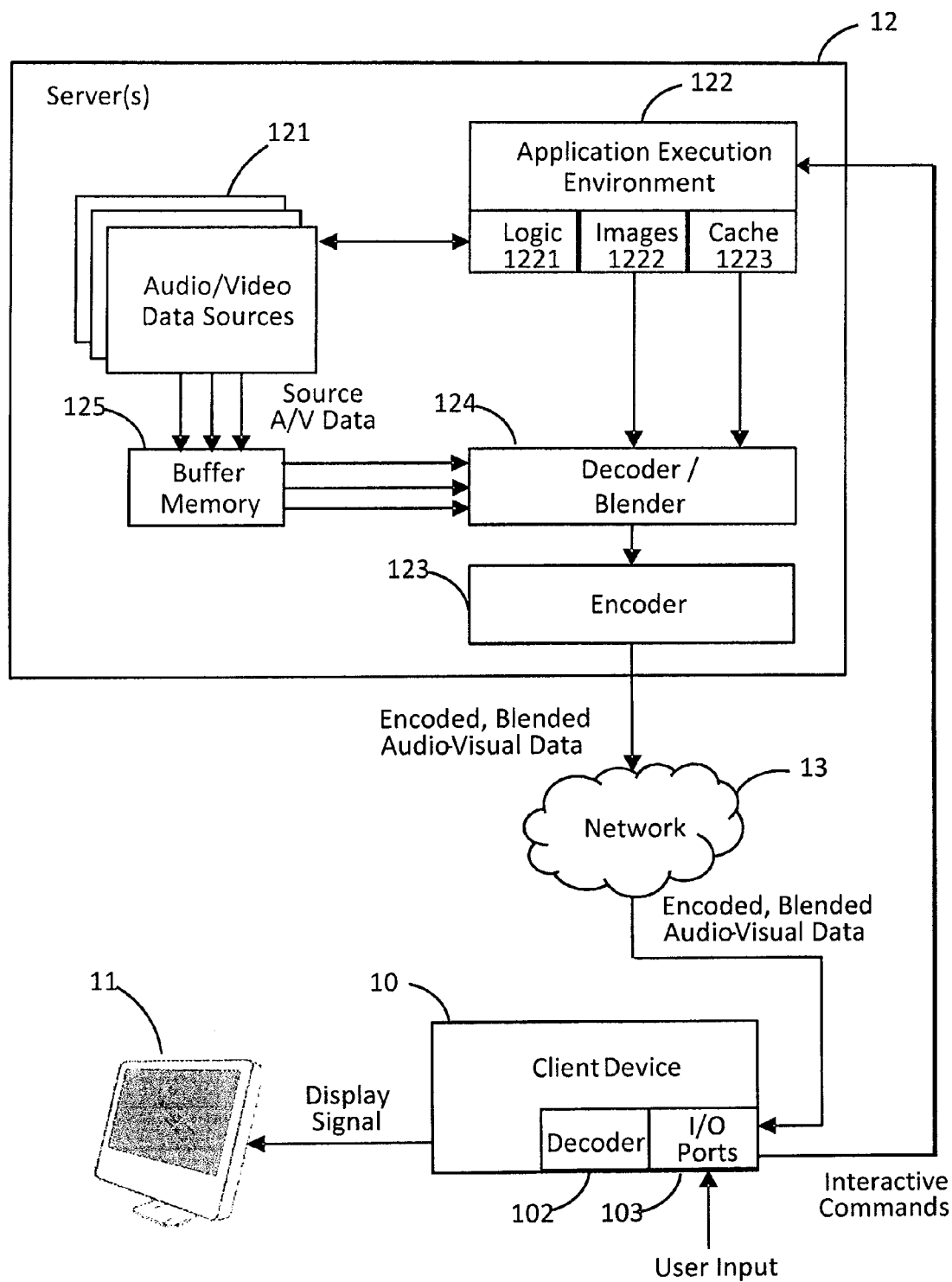
FIG. 4 schematically shows a system in accordance with a second embodiment of the invention.

FIG. 4 schematically shows a system in accordance with an embodiment of the invention in which the server 12 performs blending. The disclosure of FIG. 4 overlaps to large extent with that of FIG. 1, so only the changes will be remarked upon here. As noted above, in the scenario under consideration, the client device 10 in FIG. 4 lacks an overlay module 101 found in FIG. 1. Therefore, the server 12 includes, in addition to the encoder 123 of FIG. 1, a decoder/blender 124 for decoding and blending source video with an interactive user interface. Note that while the functions of decoding and blending are combined in decoder/blender 124 for purposes of this disclosure, these functions may be implemented in separate hardware or software. Also as described above, the server 12 further includes a buffer memory 125 for buffering frames of source video data. During ordinary operation of the system of FIG. 4, most frames of source video data buffered in the buffer memory 125 are discarded without being blended, and the decoder/blender 124 acts as a simple pass-through. However, when a user provides an interactive command to the application execution environment 122, the environment 122 provides images to the blender 124 (either preferably statically from its cache 1223, or dynamically from the image generator 1222) for blending with the buffered video. The decoder/blender 124 decodes the source video data and simulates the state of the decoder 102 as described with respect to element 35 of FIG. 3. The decoder/blender 124 then blends the interactive user interface images into the source video, one frame at a time. The decoder/blender 124 provides an output to the encoder 123, which encodes the data according to the appropriate encoding specification for transmission to the client device 10.

Figure 5:
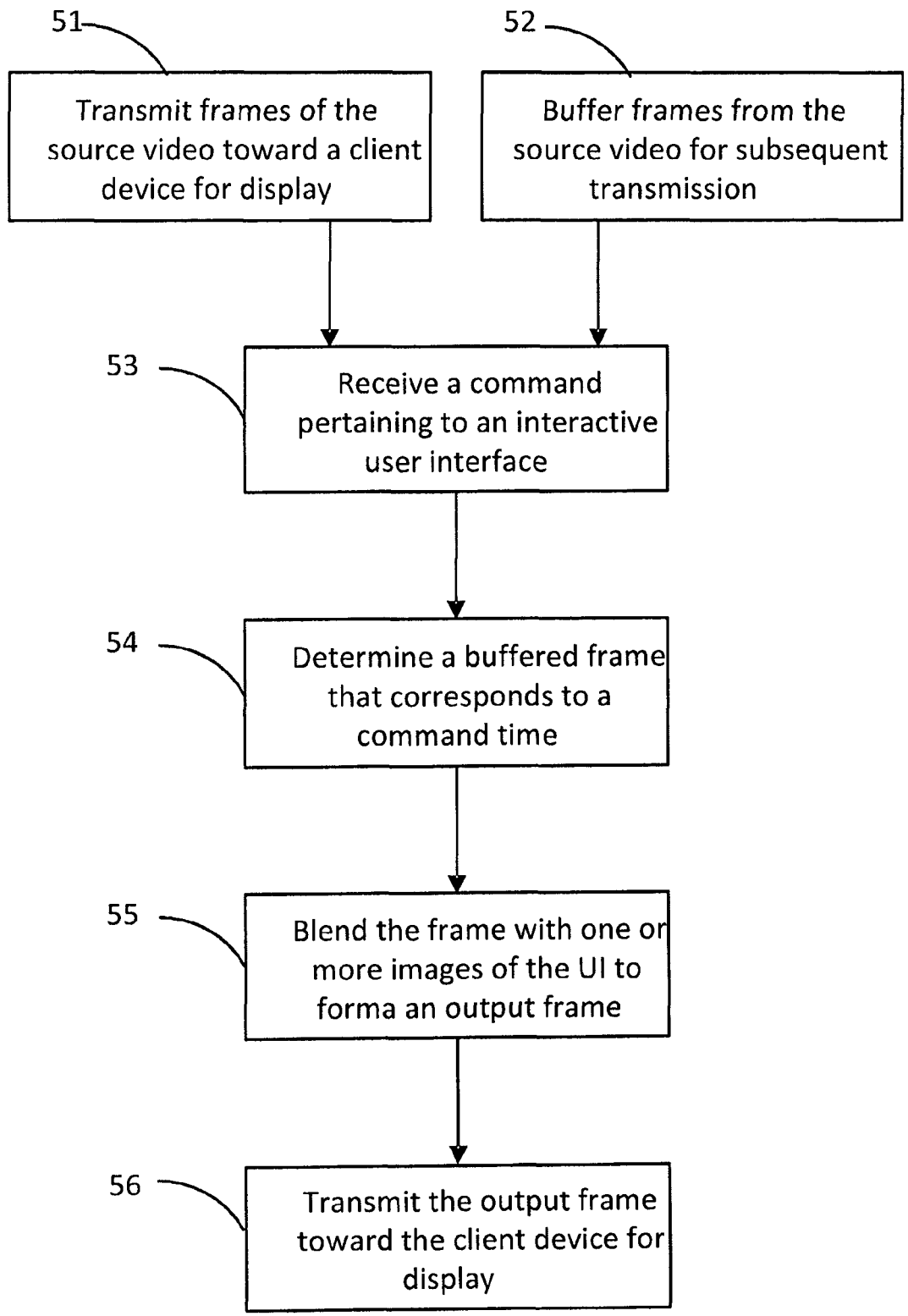
FIG. 5 is a flowchart showing operation of a server in the system of FIG. 4.

FIG. 5 is a flowchart showing operation of a server in the system of FIG. 4. In particular, FIG. 5 shows a method of providing, in a server 12, an interactive user interface for simultaneous display with a source video on a display device 11. In a first process 51, the server 12 transmits frames of the source video toward the client device 10 for display. Simultaneously, in a second process 52, the server 12 buffers frames from the source video for subsequent transmission. In process 53, the server 12 receives from the client device 10 a command 32 that relates to the interactive user interface. In process 54, the decoder/blender 124 determines a buffered frame 316 in the buffer memory 125 that corresponds to a time associated with the command 32. In process 55, the decoder/blender 124 blends the determined frame with one or more images of the interactive user interface received from the application execution environment 122 to generate an output frame that is subsequently encoded by the encoder 123. Then, in process 56, the server 12 transmits the output frame toward the client device 10 for display on the display device 11.

Note that the encoder 123 may be required to do a motion vector search after blending. There are several optimizations that can be performed to speed up this process. In a first optimization, the encoder 123 could make use of motion information found in the original video frame when it was decoded by the decoder/blender 124. However, the encoder 123 must verify whether the same motion is still present in the blended image due to the presence of the interactive user interface. In a second optimization, the source video images could be divided into rectangular areas, and motion vectors for each area are encoded separately. In this case, motion vectors for rectangles that do not intersect the user interface are unaffected by the blending, and no additional motion vector search is required for these rectangles.

Figure 6A:
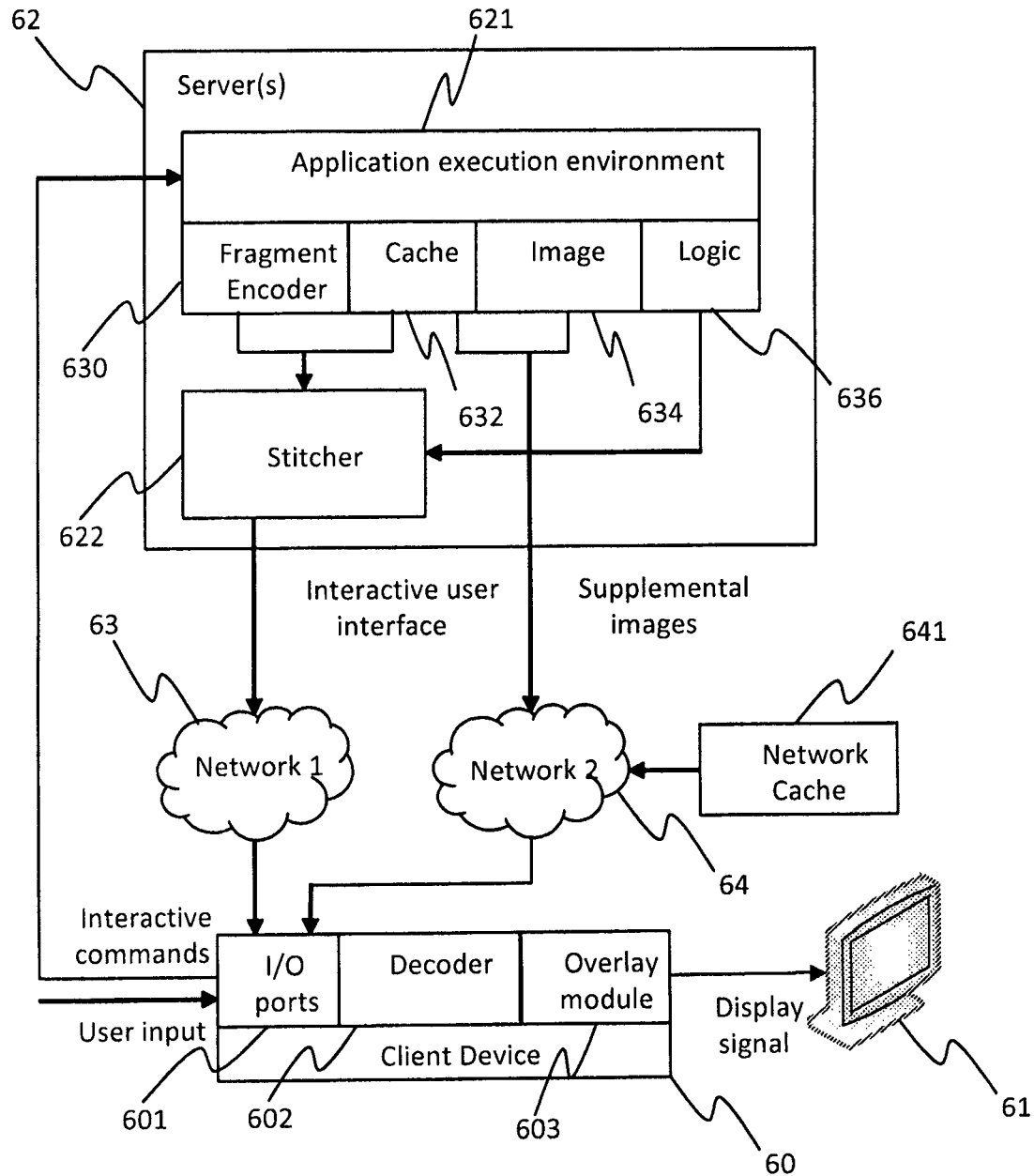
FIG. 6A schematically shows a system in accordance with a third embodiment of the invention.

FIG. 6A schematically shows a system in accordance with an embodiment of the invention in which overlay images are used to supplement a streamed interactive user interface. In U.S. application Ser. No. 12/443,571 ("Method for Streaming Parallel User Sessions, System and Computer Software"), the contents of which are hereby incorporated by reference in its entirety, a system is disclosed where an interactive user interface is streamed to a client device over a first data communications channel. The streamed interactive user interface is realized by stitching a plurality of fragments and streams into a single compliant audiovisual stream. It has been identified that for a number of reasons it is beneficial to overlay images over an encoded stream instead of encoding them in the stream, which also holds for cases in which the audiovisual stream is an interactive user interface. For example, it is beneficial to overlay images in cases involving a sprite-like user interface element (e.g., a cursor). Such a user interface element is generally arbitrarily placed on the screen and it may be more efficient to decouple the element from the interactive user interface by overlaying images. In particular, if the user interface element was instead encoded (e.g., by the fragment encoder) and subsequently stored in cache, the cache would quickly reach capacity because a sprite-like user interface element, unlike some other user interface elements (e.g., a menu), does not have a predefined position. Another example may be that the interactive user interface has a partial screen video element over which another user interface element is supposed to be rendered. In this case it is more efficient from a scalability point of view to render only the new interface element as overlay image(s).

The system disclosed in FIG. 6A is fundamentally the same as that shown in FIG. 1. Here, the client device 60 receives an interactive user interface via a first data communications channel 63 from a server 62. In some embodiments, server 62 runs an application in the application execution engine 621 that generates fragments by means of a fragment encoder 630; caches these fragments in a cache 632; and combines these (cached) fragments by means of a stitcher 622 (otherwise known as an assembler) to generate, and subsequently stream, an interactive user interface via the first data communications channel 63 to the client device 60 (as described in, U.S. application Ser. No. 12/443,571 ("Method for Streaming Parallel User Sessions, System and Computer Software")). Optionally, in some embodiments, the interactive user interface is directly encoded by an encoder of server 62 (not shown in FIG. 6A) from pixel data. The interactive user interface may be supplemented by the generation of images 634 that are to be overlain by the client device 60. These images may also be stored in a cache 632 for reuse across sessions in the same way as fragments are reused across sessions. For example, in some implementations, the interactive user interface includes a source video with images from cache 632 overlaid. The images may be sent via a second data communications channel 64 to the I/O ports 601 of client device 60. Additionally and/or alternatively, in some embodiments, server(s) 62 will transmit references to the images (such as Uniform Resource Locators or URLs), as opposed to the images themselves, so that the client can retrieve them on demand (e.g., by means of HTTP). Such embodiments are advantageous, as an intermediate network cache 641, accessible through second data communications channel 64, can be used to store reusable images closer to the client device. The stream received from server 62 is decoded in the decoder 602 and combined with the images received or retrieved from server 62 in the overlay module 603 for display on 61 as described in the embodiment described in relation to FIG. 1. In some implementations, client device 60 switches between 1) receiving the interactive user interface from the stitcher, and 2) blending the interactive user interface from the stitcher with overlay images.

Figure 6B:
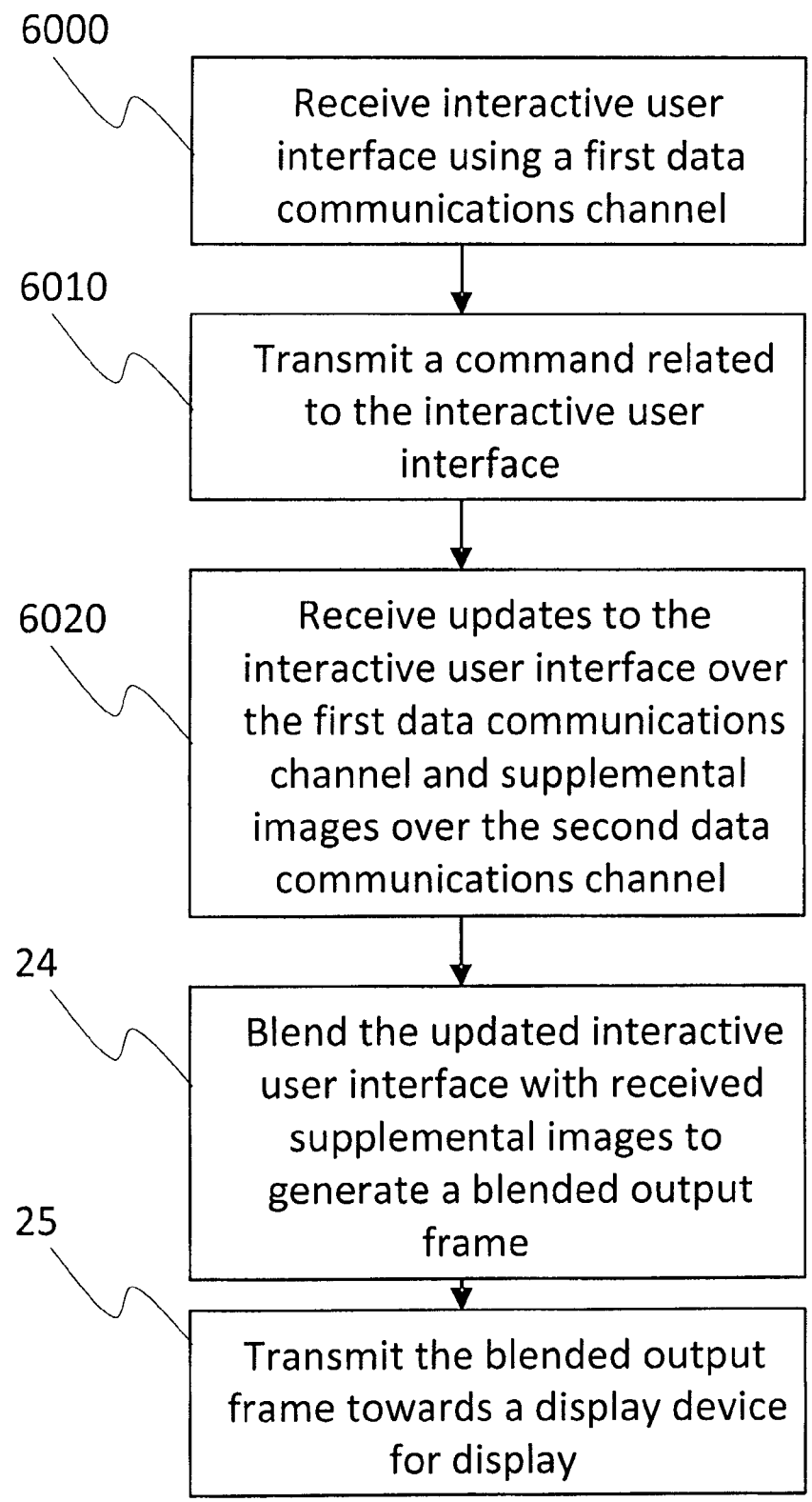
FIG. 6B is a flowchart showing operation of a client device in the system of FIG. 6A.

FIG. 6B is a flowchart showing operations of a client device in the system of FIG. 6A. The flow chart is very similar to the operations described in the flow chart in FIG. 2. However, instead of receiving a source video using the first data communications channel, the client device receives (6000) the interactive user interface via the first data communications channel. In some embodiments, the interactive user interface is a video stream, such as an MPEG video stream. Next, a command related to that interactive user interface is transmitted (6010) to the server. The client may subsequently receive (6020) updates to the interactive user interface via the first data communications channel and/or supplemental images from the same server to supplement the interactive user interface. The remaining processes 24 and 25 are the same as those described with respect to FIG. 1.

In some embodiments, since the first data communications channel and the second data communications channel are completely independent channels, the graphical information transmitted over both data channels is likely to be related. Therefore, special care must be taken when the images are combined with the video stream representing the interactive user interface. A loosely coupled synchronization mechanism, such as for example a presentation timestamp and timeout for each image, may be used to synchronize the display of images with the streamed interactive user interface.

Figure 7A:
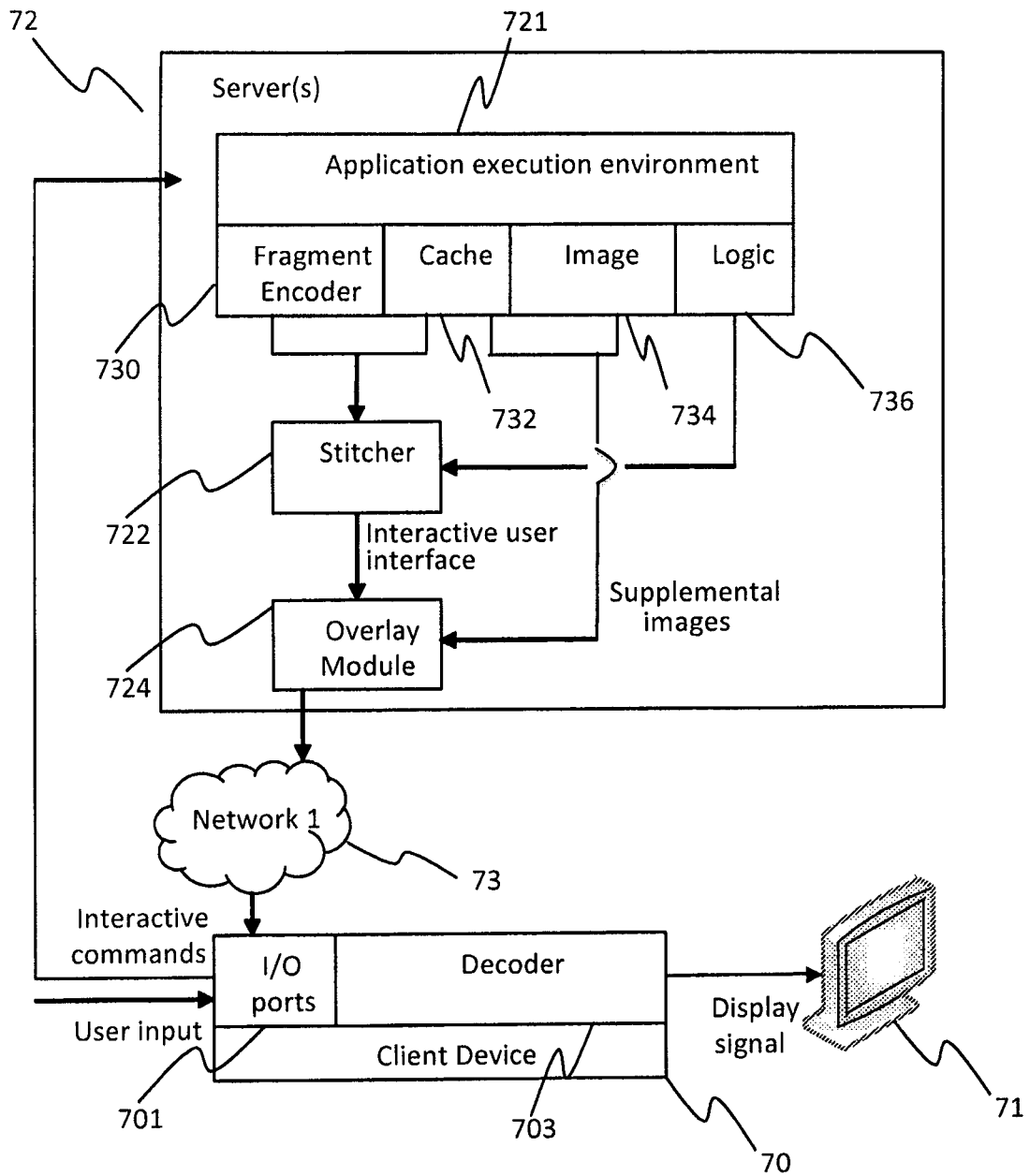
FIG. 7A schematically shows a system in accordance with a fourth embodiment of the invention.

FIG. 7A schematically shows an alternative embodiment of the system described in FIG. 6A. The system disclosed in FIG. 7A is similar to the systems depicted by FIGS. 4 and 6A. Here, the server (specifically, overlay module 724 of server 72), and not the client device, overlays images over the encoded stream. In other words, the blending occurs at the server, as described in relation to FIG. 4.

As illustrated, in some implementations, client device 703 does not include an overlay module. Moreover, as shown, the system of FIG. 7A does not utilize a second data communications channel.

As in the system of FIG. 6A, stitcher 722 generates an interactive user interface by combining fragments, generated by fragment encoder 730, and stored in cache 732. Overlay module 724 overlays images 734 over the resulting interactive user interface received from stitcher 722. As illustrated, client device 70 then receives the encoded stream, which includes interactive user interface and overlay images 734, via a first data communications channel 73 from server 72. In optional implementations, server 72 (or, alternatively, overlay module 724) is configured to switch between transmitting (i) the encoded stream including the interactive user interface and overlay images 734, and (ii) only the interactive user interface. Alternatively, in some implementations, overlay module 724 and stitcher 722 exist and operate as a single component of server 72.

Figure 7B:
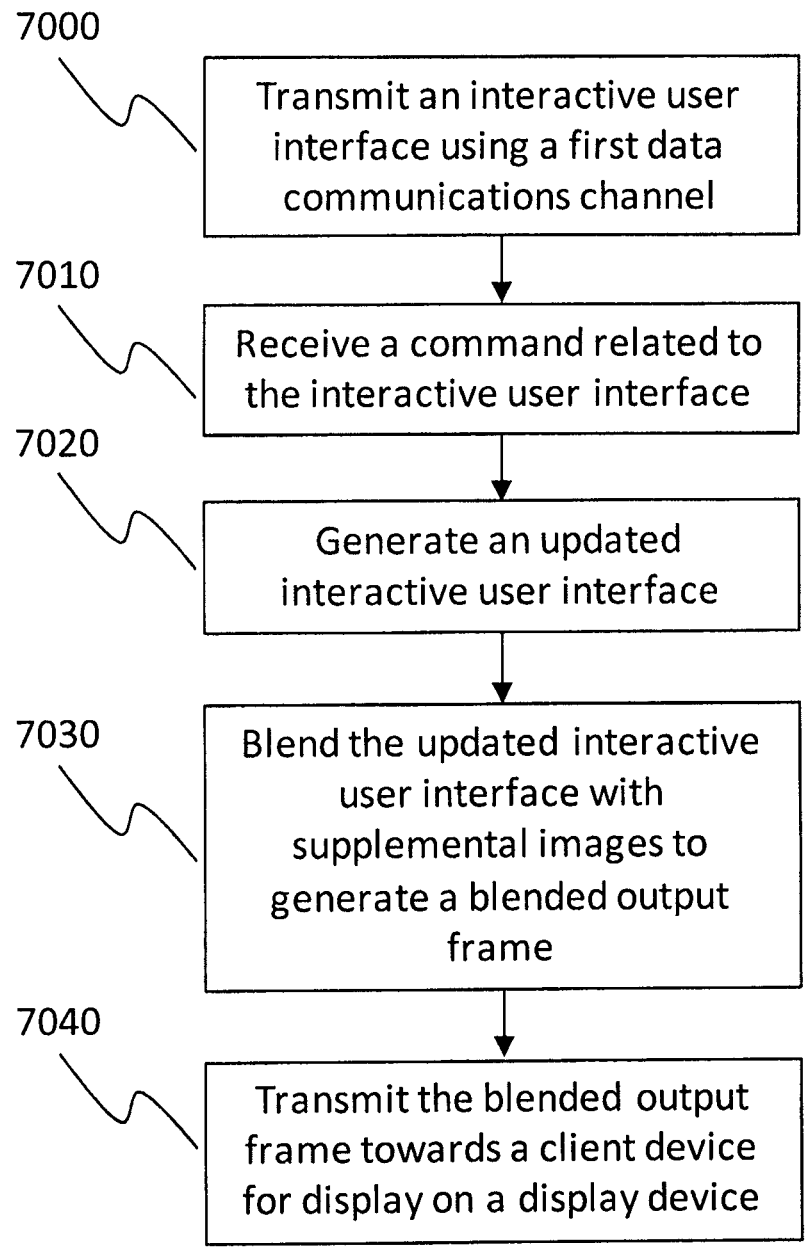
FIG. 7B is a flowchart showing operation of a server in the system of FIG. 7A.

FIG. 7B is a flowchart showing operations of a client device in the system of FIG. 7A. The flow chart is very similar to the operations described in the flow chart in FIG. 6B, but written with respect to a server (e.g., server 72) that is configured (e.g., overlay module 724) to overlay images. In process 7000, the server transmits the interactive user interface via a first data communications channel. Next, in process 7010, the server receives a command related to the interactive user interface. In process 7020, the server generates an updated interactive user interface. Further, in process 7030, the server blends the updated interactive user interface with supplemental images to generate a blended output frame which, in process 7040, is transmitted towards the client device. As described above, in optional implementations, the server switches between transmitting (i) the blended output frame including the interactive user interface and overlay images, and (i) the interactive user interface.

Figure 8A:
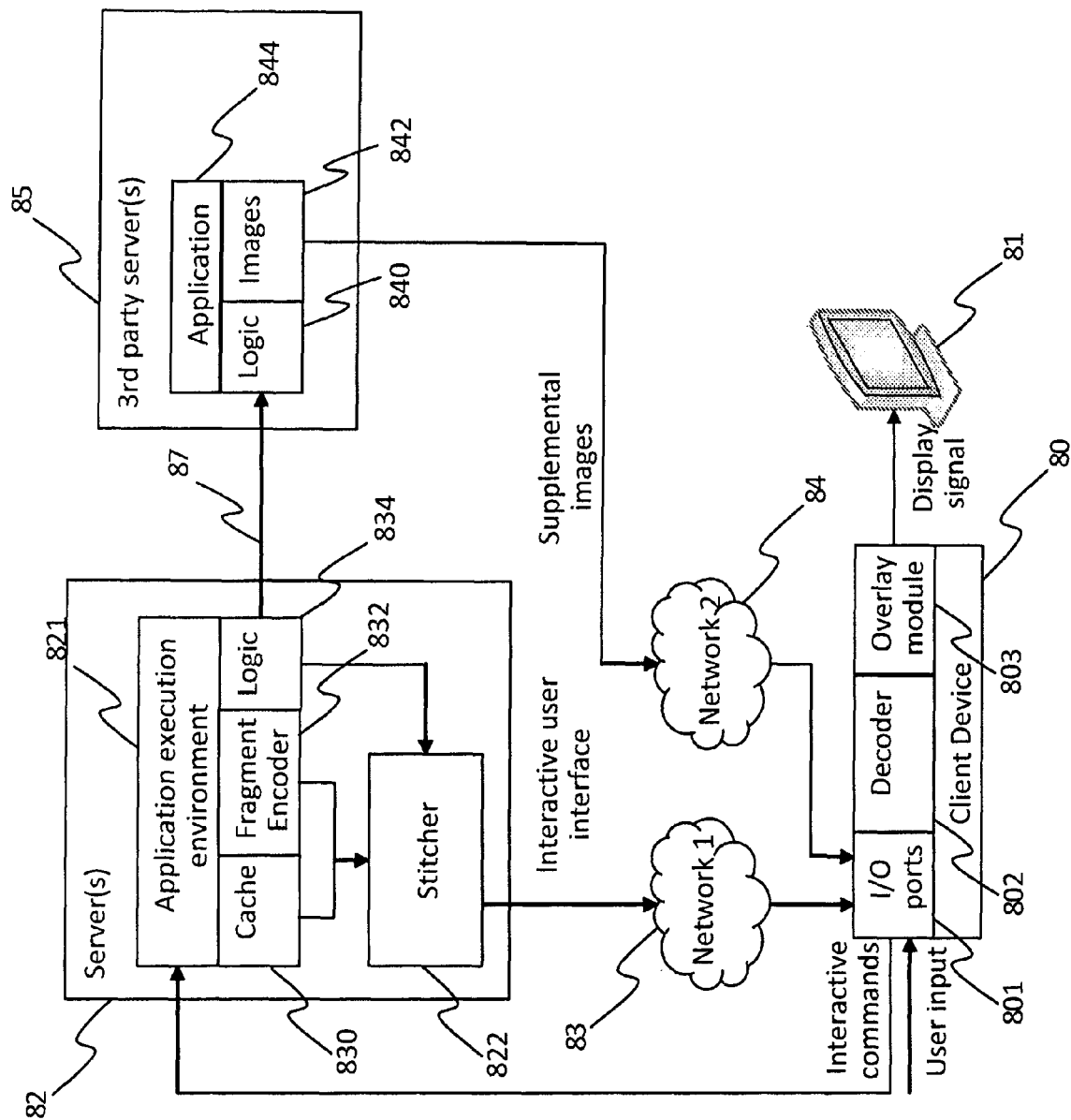
FIG. 8A schematically shows a system in accordance with a fifth embodiment of the invention.

FIG. 8A schematically shows an alternative embodiment, similar to the system described in FIG. 6A, in which the supplemental overlay images are sourced from a third party server. The embodiment provides a strict separation between an interactive user interface and information from a third party, by conveying the interactive user interface and information from a third party over separate data communications channels. An example of a system requiring such a separation is a banking application where the interactive user interface is the same for every user, except for account related information that is sent directly to the end user as supplemental images (e.g., supplemental images sent by third party server 85) over a secure data communications channel (e.g., second data communications channel 84).

The system disclosed in FIG. 8A is very similar to the system depicted by FIG. 6A. The main difference being that one or more images originate from a third party server 85, and are sent as supplemental images to client device 80 over second data communications channel 84. In some embodiments, second data communications channel 84 is a secure channel (e.g., a secure transport protocol is used for the images, such as HTTPS). The application may use application logic 834 to liaise with application logic 840 of an application 844 on a third party server 85 via a communication channel 87 to generate one or more images 842 that supplement the interactive user interface with third party information.

Figure 8B:
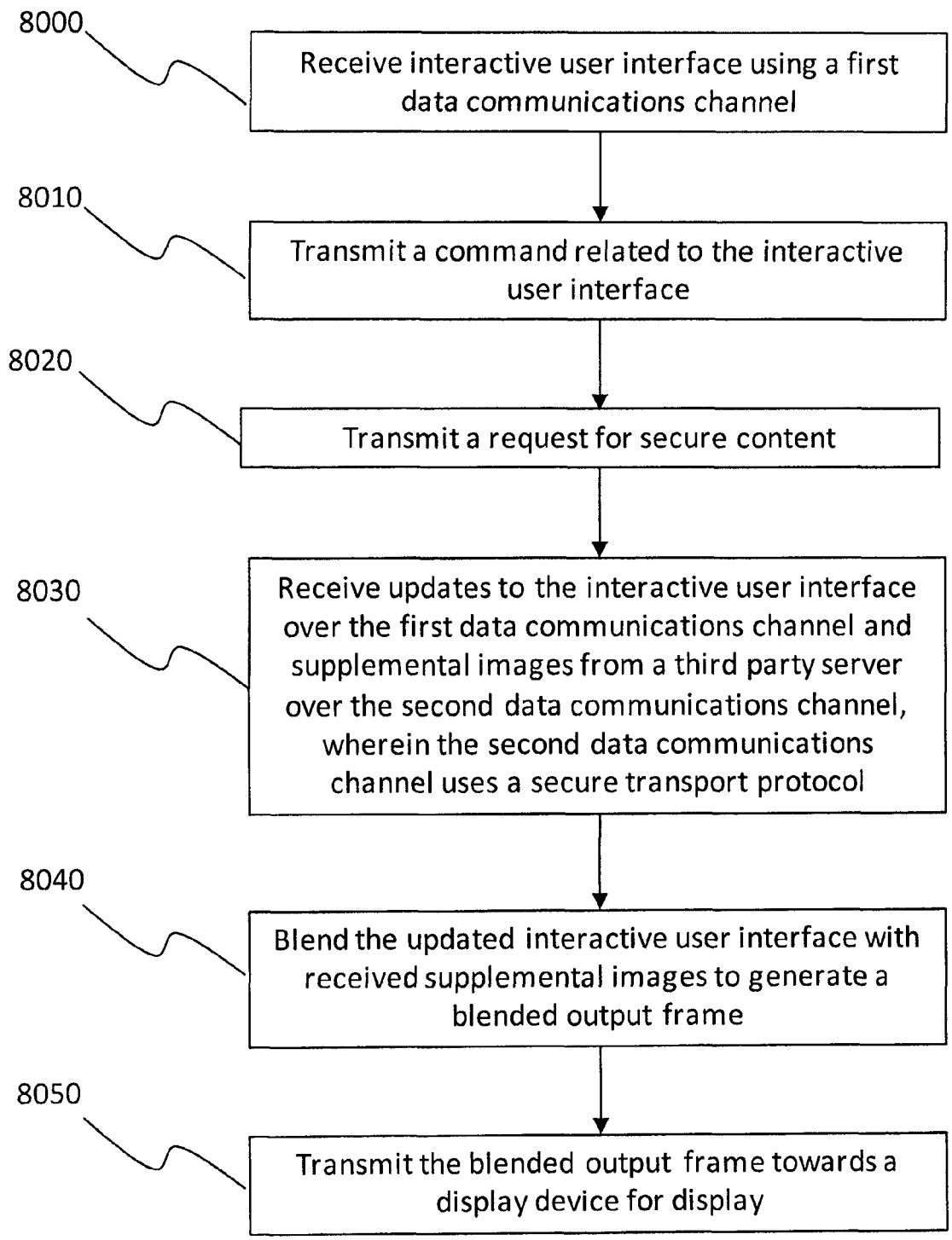
FIG. 8B is a flowchart showing operation of a client device in the system of FIG. 8A.

FIG. 8B is a flowchart showing operations of a client device in the system of FIG. 8A. The flow chart is similar to the flow chart in FIG. 6B. Here, the device transmits (8020) a request for secure content, and supplemental images are received (8030) from a third party server over a second data communications channel, where, in some embodiments, the second data communications channel uses a secure transport protocol.

The embodiments of the invention described above are intended to be merely exemplary; numerous variations and modifications will be apparent to those skilled in the art. All such variations and modifications are intended to be within the scope of the present invention as defined in any appended claims. For those skilled in the art it will also be evident that it may be beneficial for systems to switch between the embodiments of the invention on demand.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

What is claimed is:

1. A method of combining an interactive user interface for generating a blended output that includes the interactive user interface and one or more supplemental images, the method comprising:
   at a client device remote from a server:
   receiving a video stream that contains an interactive user interface from the server using a first data communications channel configured to communicate video content;
   transmitting to the server a command that relates to a user input received through the interactive user interface, wherein the command is a request for secure content;
   receiving, in response to the transmitting, an updated user interface from the server using the first data communications channel,
   receiving from a third-party server, in response to the transmitting, one or more supplemental images for supplementing the interactive user interface using a second data communications channel that is different from the first data communications channel and uses a secure transport protocol, wherein each supplemental image of the one or more supplemental images is associated with a corresponding transparency coefficient;
   blending the updated user interface and the one or more supplemental images according to the transparency coefficient for each supplemental image of the one or more supplemental images to generate a blended output; and
   transmitting the blended output toward the display device for display thereon.

2. The method according to claim 1, wherein the interactive user interface comprises a source video stitched with user interface content.

3. The method according to claim 1, wherein an encoding specification for the video stream is an MPEG specification, an AVS specification, or a VC-1 specification.

4. The method according to claim 1, wherein the first data communications channel comprises at least one of: quadrature amplitude modulation (QAM) using a cable network infrastructure, user datagram protocol over internet protocol (UDP/IP) using an internet protocol television (IPTV) infrastructure, or hypertext transfer protocol (HTTP) using a public or private internet infrastructure, and the second data communications channel comprises at least one of transmission control protocol over internet protocol (TCP/IP), remote frame buffer (RFB) protocol, and extended remoting technology (XRT) protocol.

5. The method according to claim 1, wherein the blending comprises blending in a spatial domain.

6. A method of providing an interactive user interface for generating a blended output that includes the interactive user interface and one or more supplemental images, the method comprising:
   at a server remote from a client device:
   transmitting a video stream that includes an interactive user interface towards the client device using a first data communications channel configured to communicate video content;
   receiving a command that relates to a user input received through the interactive user interface;
   generating an updated interactive user interface;
   blending the updated interactive user interface and one or more supplemental images to generate a blended output frame, wherein each supplemental image of the one or more supplemental images is associated with a corresponding transparency coefficient and the blending is performed according to the transparency coefficient for each supplemental image of the one or more supplemental images;
   transmitting the blended output frame toward the client device for display on a display device;
   switching between transmitting the blended output frame and transmitting the updated interactive user interface; and
   transmitting the updated interactive user interface toward the client device for display on the display device.

7. The method according to claim 6, wherein an encoding specification for the video stream is an MPEG specification, an AVS specification, or a VC-1 specification.

8. The method according to claim 6, wherein the first data communications channel comprises at least one of: quadrature amplitude modulation (QAM) using a cable network infrastructure, user datagram protocol over internet protocol (UDP/IP) using an internet protocol television (IPTV) infrastructure, or hypertext transfer protocol (HTTP) using a public or private internet infrastructure, and wherein an image format of the one or more supplemental images is a bitmap (BMP) file format, a portable network graphics (PNG) file format, a joint photographic experts group (JPEG) file format, or a graphics interchange format (GIF) file format.

9. The method according to claim 6, further comprising first determining that the client device is not capable of overlaying.

\* \* \* \* \*